(12) United States Patent
Van Buskirk et al.

(10) Patent No.: US 9,068,089 B2
(45) Date of Patent: Jun. 30, 2015

(54) PHENOLIC ADMIX FOR ELECTRODEPOSITABLE COATING COMPOSITION CONTAINING A CYCLIC GUANIDINE

(71) Applicant: PPG Industries Ohio, Inc., Cleveland, OH (US)

(72) Inventors: Ellor J. Van Buskirk, Pittsburgh, PA (US); Craig A. Wilson, Allison Park, PA (US); David Stone, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 121 days.

(21) Appl. No.: 13/839,648

(22) Filed: Mar. 15, 2013

(65) Prior Publication Data
US 2014/0262786 A1    Sep. 18, 2014

(51) Int. Cl.
*C09D 5/44* (2006.01)
*C25D 13/04* (2006.01)
*C09D 5/00* (2006.01)

(52) U.S. Cl.
CPC .............. *C09D 5/4453* (2013.01); *C25D 13/04* (2013.01); *C09D 5/00* (2013.01)

(58) Field of Classification Search
CPC ......... C09D 5/4453; C09D 5/00; C02D 13/04
See application file for complete search history.

(56) References Cited

U.S. PATENT DOCUMENTS

| | | |
|---|---|---|
| 2,473,111 A | 6/1949 | Short et al. |
| 3,455,806 A | 7/1969 | Spoor et al. |
| 3,663,389 A | 5/1972 | Koral et al. |
| 3,724,386 A | 4/1973 | Schmidt |
| 3,769,288 A | 10/1973 | Stähle et al. |
| 3,793,278 A | 2/1974 | De Bona |
| 3,909,200 A | 9/1975 | Redmore |
| 3,928,157 A | 12/1975 | Suematsu et al. |
| 3,945,961 A | 3/1976 | Blank |
| 3,947,338 A | 3/1976 | Jerabek et al. |
| 3,947,339 A | 3/1976 | Jerabek et al. |
| 3,959,106 A | 5/1976 | Bosso et al. |
| 3,962,165 A | 6/1976 | Bosso et al. |
| 3,975,346 A | 8/1976 | Bosso et al. |
| 3,984,299 A | 10/1976 | Jerabek |
| 3,984,922 A | 10/1976 | Rosen |
| 4,001,101 A | 1/1977 | Bosso et al. |
| 4,104,147 A | 8/1978 | Marchetti et al. |
| 4,116,900 A | 9/1978 | Belanger |
| 4,134,866 A | 1/1979 | Tominaga et al. |
| 4,134,932 A | 1/1979 | Kempter et al. |
| 4,148,772 A | 4/1979 | Marchetti et al. |
| 4,238,594 A | 12/1980 | Pampouchidis |
| 4,297,255 A | 10/1981 | Schenck et al. |
| 4,352,842 A | 10/1982 | Kooymans et al. |
| 4,401,774 A | 8/1983 | Kooymans et al. |
| 4,420,574 A | 12/1983 | Moriarity et al. |
| 4,423,166 A | 12/1983 | Moriarity et al. |
| 4,423,850 A | 1/1984 | Bass |
| 4,468,307 A | 8/1984 | Wismer et al. |
| 4,543,376 A | 9/1985 | Schupp et al. |
| 4,546,165 A | 10/1985 | Groegler et al. |
| 4,568,719 A | 2/1986 | Tada et al. |
| 4,617,281 A | 10/1986 | Green |
| 4,663,472 A | 5/1987 | Green |
| 4,715,898 A | 12/1987 | Johnson |
| 4,757,116 A | 7/1988 | Greco et al. |
| 4,761,337 A | 8/1988 | Guagliardo et al. |
| 4,797,487 A | 1/1989 | A'Court |
| 4,869,772 A | 9/1989 | McDonnell et al. |
| 4,874,822 A | 10/1989 | Rasmussen et al. |
| 4,931,157 A | 6/1990 | Valko et al. |
| 5,096,556 A | 3/1992 | Corrigan et al. |
| 5,268,473 A | 12/1993 | Moren et al. |
| 5,506,279 A | 4/1996 | Babu et al. |
| 5,659,011 A | 8/1997 | Waldmann |
| 5,902,473 A | 5/1999 | Harris et al. |
| 5,998,013 A | 12/1999 | Shoshi et al. |
| 6,057,034 A | 5/2000 | Yamazaki et al. |
| 6,075,065 A | 6/2000 | Yamazaki et al. |
| 6,165,338 A | 12/2000 | December et al. |
| 6,245,922 B1 | 6/2001 | Heilmann et al. |
| 6,248,225 B1 | 6/2001 | Palaika et al. |

(Continued)

FOREIGN PATENT DOCUMENTS

| | | |
|---|---|---|
| DE | 102006056311 A1 | 6/2008 |
| EP | 0012463 A1 | 6/1980 |
| EP | 0152240 A2 | 8/1985 |
| EP | 0198680 A1 | 10/1986 |
| EP | 0295930 A2 | 12/1988 |
| EP | 0380178 B1 | 1/1990 |
| EP | 0449488 A1 | 10/1991 |
| EP | 0554023 A1 | 8/1993 |
| EP | 0874012 A1 | 4/1998 |
| EP | 1788035 A1 | 5/2007 |
| JP | 2189330 A | 7/1990 |
| JP | 06033332 A | 2/1994 |
| JP | 10265612 A | 10/1998 |
| JP | 11021352 A | 1/1999 |
| JP | 2000273280 A | 10/2000 |

(Continued)

OTHER PUBLICATIONS

Cotton et al., "Homologues of the easily ionized compound Mo2(hpp)4 containing smaller bicyclic guanidinates", Inorganic Chemistry 45 (14), 2006, pp. 5493-5500.

(Continued)

*Primary Examiner* — Kishor Mayekar
(74) *Attorney, Agent, or Firm* — Alicia M. Passerin, Esq.

(57) ABSTRACT

The present invention is directed to an electrodepositable coating composition comprising a reaction product of an epoxy functional polymer and a cyclic guanidine, and a source of unreacted phenol, wherein the electrodepositable coating composition has a columbic usage of less than 100 coulombs/gram when deposited on a conductive substrate at a current density of $\leq 1.5$ mAmps/cm$^2$. Methods of making the electrodepositable coating composition are also disclosed.

19 Claims, 1 Drawing Sheet

(56) References Cited

U.S. PATENT DOCUMENTS

| | | |
|---|---|---|
| 6,506,858 B1 | 1/2003 | Knuuttila et al. |
| 6,550,260 B1 | 4/2003 | Sullivan |
| 6,617,399 B2 | 9/2003 | Konarski |
| 6,635,690 B2 | 10/2003 | Heilmann et al. |
| 6,743,921 B2 | 6/2004 | Tucker et al. |
| 6,852,193 B2 | 2/2005 | Kneafsey et al. |
| 6,875,800 B2 | 4/2005 | Vanier et al. |
| 6,894,082 B2 | 5/2005 | Brantl et al. |
| 6,894,086 B2 | 5/2005 | Munro et al. |
| 6,936,641 B2 | 8/2005 | Molock et al. |
| 7,012,120 B2 | 3/2006 | Klemarczyk et al. |
| 7,015,286 B2 | 3/2006 | Heilmann et al. |
| 7,074,858 B2 | 7/2006 | Heilmann et al. |
| 7,109,061 B2 | 9/2006 | Crane et al. |
| 7,211,616 B2 | 5/2007 | Kaszubski et al. |
| 7,384,984 B2 | 6/2008 | Lewandowski et al. |
| 7,842,762 B2 | 11/2010 | Zawacky et al. |
| 8,039,618 B2 | 10/2011 | Minch et al. |
| 8,148,490 B2 | 4/2012 | McCollum et al. |
| 8,153,344 B2 | 4/2012 | Faler et al. |
| 8,288,504 B2 | 10/2012 | Zawacky et al. |
| 8,334,380 B2 | 12/2012 | Boyd et al. |
| 8,563,560 B2 | 10/2013 | Hickenboth et al. |
| 2003/0092694 A1 | 5/2003 | Nilsson et al. |
| 2003/0096908 A1 | 5/2003 | Heilmann et al. |
| 2003/0164222 A1 | 9/2003 | Kneafsey et al. |
| 2003/0181318 A1 | 9/2003 | Tucker et al. |
| 2003/0185788 A1 | 10/2003 | Rothbard et al. |
| 2003/0212210 A1 | 11/2003 | Heilmann et al. |
| 2003/0216519 A1 | 11/2003 | Heilmann et al. |
| 2004/0059044 A1 | 3/2004 | Olson et al. |
| 2004/0063848 A1 | 4/2004 | Olson et al. |
| 2005/0182148 A1 | 8/2005 | Gaud et al. |
| 2005/0211580 A1 | 9/2005 | Kaszubski et al. |
| 2005/0288457 A1 | 12/2005 | Liu et al. |
| 2005/0288458 A1 | 12/2005 | Klemarczyk et al. |
| 2006/0004119 A1 | 1/2006 | Molock et al. |
| 2006/0046068 A1 | 3/2006 | Barancyk et al. |
| 2006/0068198 A1 | 3/2006 | Bratys et al. |
| 2006/0144290 A1 | 7/2006 | Polk et al. |
| 2006/0158001 A1 | 7/2006 | Emch et al. |
| 2006/0229419 A1 | 10/2006 | Eswarakrishnan et al. |
| 2006/0246305 A1 | 11/2006 | Cheng et al. |
| 2006/0247372 A1 | 11/2006 | Faler et al. |
| 2006/0251896 A1 | 11/2006 | Ferencz et al. |
| 2006/0276461 A1 | 12/2006 | Old et al. |
| 2007/0048445 A1 | 3/2007 | DiMario |
| 2007/0048504 A1 | 3/2007 | DiMario |
| 2007/0149654 A1 | 6/2007 | Cheng et al. |
| 2008/0112909 A1 | 5/2008 | Faler et al. |
| 2009/0042020 A1 | 2/2009 | Ferencz et al. |
| 2009/0042060 A1 | 2/2009 | Zawacky et al. |
| 2009/0171025 A1 | 7/2009 | Matsushita et al. |
| 2009/0281313 A1 | 11/2009 | Minch et al. |
| 2009/0281314 A1 | 11/2009 | Boyd et al. |
| 2009/0286978 A1 | 11/2009 | Minch et al. |
| 2009/0326098 A1 | 12/2009 | Ferencz et al. |
| 2011/0005937 A1 | 1/2011 | Zawacky et al. |
| 2011/0224328 A1 | 9/2011 | McCollum et al. |
| 2011/0224403 A1 | 9/2011 | Zawacky et al. |

FOREIGN PATENT DOCUMENTS

| | | |
|---|---|---|
| JP | 2006199721 A | 8/2006 |
| WO | 97/05101 A1 | 2/1997 |
| WO | 01/92434 A1 | 12/2001 |
| WO | 02/102909 A1 | 12/2002 |
| WO | 2005000914 A1 | 1/2005 |
| WO | 2007037484 A1 | 5/2007 |
| WO | 2009021095 A1 | 2/2009 |
| WO | 2009027186 A2 | 3/2009 |
| WO | 2009137728 A2 | 11/2009 |
| WO | 2011079041 A1 | 6/2011 |
| WO | 2011112594 A1 | 9/2011 |

OTHER PUBLICATIONS

Davis et al., "The Urea Dearrangement", J. Am. Chem. Soc., 45 (7), 1923, pp. 1816-1820.

Dovlatyan et al., "Reactions of derivatives of amino- and mercapto-sym-triazines with ethyleneimine and ethylenediamine", Chemistry of Heterocyclic Compounds 29 (6), 1993, pp. 704-707.

Echavarren et al., "Anion-receptor molecules: Synthesis of a chiral and functionalized binding subunit, a bicyclic guanidinium group derived from L- or D-Asparagine", Helvitica Chem Acta, 71, 1988, pp. 685-693.

Edwards, "Nonsymmetrical cyclic urea inhibitors of HIV-1 aspartic proteins", Drug Discovery Today 11 (11-12), 2006, pp. 569-570.

Han et al., "Synthesis of carbamates and ureas using ZR(IV)-catalyzed exchange processes", Org Lett 9 (8), 2007, pp. 1517-1520.

Hovelmann et al., "Direct synthesis of bicyclic guanidines through unprecedented palladium(II) catalyzed diamination with copper chloride as oxidant", Chem Comm 2008, pp. 2334-2336.

Juaristi et al., "Synthesis of new chiral derivatives of N,N7-Dimethylpropyleneurea (DMPU) and examination of their influence of regio- and enantioselectivity of addition of 2-(1,3-dithianyl-)lithium to cyclohex-2-en-1-one", Helvitica Chim Acta 85, 2002, pp. 1999-2008.

Kurihara et al., "Design and synthesis of cyclic urea compounds: A pharmacological study for retinoidal activity", Bioorganic and Med Chem Lett 14, 2004, pp. 4131-3134.

Margetica et al., "Reactions of dimethyl carbonate with aliphatic amines under high pressure", Synthetic Communication: An International J for Rapid Communication of Synthetic Organic Chemistry 41, 2011, pp. 2283-2289.

McKay et al., "Influence of Steric and Polar Effects of Base Strengths of Bicyclic Guanidines", Can. J. Chem., 40, 1962, pp. 1160-1163.

Rao et al., "1,5,7-Triazabicyclo[4.4.0]dec-5-ene immobilized in MCM-41: A strongly basic porous catalyst", Agnew Chem Int Ed Engl 36 (23), 1997, pp. 2661-2663.

Rao et al., "Synthesis of a new bicyclic guanidine heterocycle as a potential anti-HIV agent", Tetrahedron Lett 34 (31), 1993, pp. 4993-4996.

Schmidtchen, "Synthese Symmerrisch substituierter bicyclischer guanidine", Chemische Berichte, 113 (6), 1980, pp. 2175-2182.

Shen et al., "Chiral bicyclic guanidine-catalyzed enantioselective reactions of anthrones", J Am Chem Soc 128, 2006, pp. 13692-13693.

Shikhaliev et al., "Cyanamides in cyclization reactions with anthranilates, 2-aminophenylketones, and methyl-2-(3-oxopiperazin-2-yl)acetate", Russian Chem Bull 7 (1), 2008, pp. 170-176.

Simoni et al., "Strong bicyclic guanidine base-promoted Wittig and Horner-Emmons Reactions", Org Lett 2 (24), 2000, pp. 3765-3768.

Ulrich et al., "Macrocyclic ureas as masked isocyanates", J. Org. Chem. 43(8), 1978, pp. 1544-1546.

U.S. Appl. No. 10/876,031 entitled "Aqueous dispersions of microparticles having a nanoparticulate phase and coating compositions containing the same", filed Jun. 24, 2004.

You et al., "New AZT conjugates as potent anti-HIV agents", Nucleosides Nucleotides Nucleic Acids 25 (1), 2006, pp. 37-54.

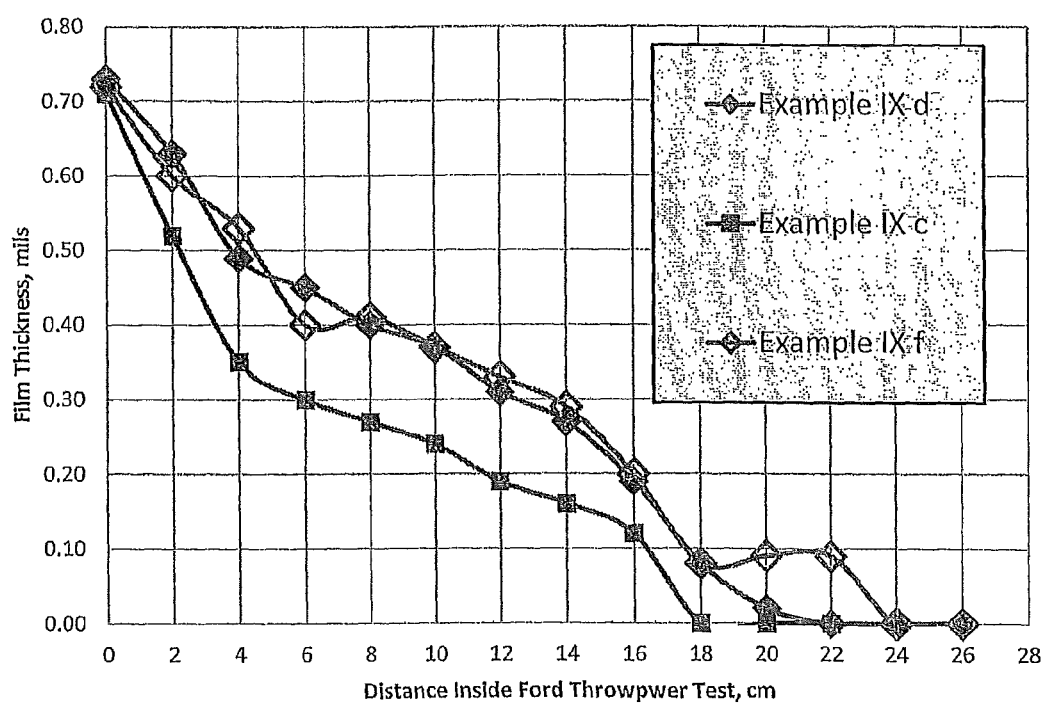

PHENOLIC ADMIX FOR ELECTRODEPOSITABLE COATING COMPOSITION CONTAINING A CYCLIC GUANIDINE

FIELD

The present invention is directed towards an electrodepositable coating composition comprising a cyclic guanidine and a phenolic admixture and to a method for coating a metal substrate.

BACKGROUND

High throwpower, or the ability of an electrodepositable coating to coat interior or recessed surfaces to provide corrosion protection in difficult to coat areas, is a desirable trait in electrodepositable coatings. During electrodeposition, exterior surfaces and surfaces closer to the cathode are coated first, and the coating thickness at these locations continues to increase as surfaces further from the cathode are subsequently coated. As a result, in order for a standard electrodepositable coating to achieve minimum targets on interior surfaces and/or surfaces further from the cathode, film thickness on exterior surfaces and surfaces closer to the cathode may significantly exceed target levels. Electrodepositable coatings with higher throwpower result in a coating with a more uniform film thickness over the surface of the substrate. Using a superior throwpower electrocoat reduces paint consumption, the number of partial or uncoated parts, and the reprocessing associated with them.

Additionally, cationic electrocoats which use cyclic guanidine in the amination of epoxy resins cure effectively with blocked isocyanates in the absence of other metal catalysts. However, coating compositions that include cyclic guanidine deposit on substrate poorly and conventional methods of altering throwpower, such as by increasing voltage, increasing current density, and/or increasing the time in which electrodeposition takes place do not ameliorate the deficiencies.

Accordingly, there is a need for a cyclic guanidine-containing coating composition that is efficiently and adequately deposited on a substrate.

SUMMARY

In certain embodiments, the present invention is directed an electrodepositable coating composition comprising a reaction product of an epoxy functional polymer and a cyclic guanidine, and a source of unreacted phenol, wherein the electrodepositable coating composition has a columbic usage of less than 100 coulombs/gram when deposited on a conductive substrate at a current density of $\leq 1.5$ mAmps/cm$^2$.

In certain other embodiments, the present invention is directed to method for coating a metal substrate comprising forming a reaction product comprising an epoxy functional polymer and a cyclic guanidine, and adding a source of unreacted phenol to the reaction product to form an electrodepositable coating composition.

BRIEF DESCRIPTION OF THE DRAWINGS

FIG. 1 is a graphical representation of observed results of Example 11.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As used herein, "includes" and like terms means "including without limitation."

The metal ions and metals referred to herein are those elements included in such designated group of the CAS Periodic Table of the Elements as is shown, for example, in Hawley's Condensed Chemical Dictionary, 15$^{th}$ Edition (2007).

As used herein, the term "Group IIIB and/or IVB metal" refers to an element that is in Group IIIB or Group IVB of the CAS Periodic Table of the Elements. Where applicable, the metal themselves may be used. In certain embodiments, Group IIIB and/or Group IVB metal compounds are used. As used herein, the term "Group IIIB and/or IVB metal compound" refers to compounds that include at least one element that is in Group IIIB or Group IVB of the CAS Period Table of the Elements.

As used herein, the term "pretreatment composition" refers to a composition that, upon contact with a substrate, reacts with and chemically alters the substrate surface and binds to it to form a protective layer.

As employed herein, the term "polyol" or variations thereof refers broadly to a material having an average of two or more hydroxyl groups per molecule.

As used herein, the term "polymer" refers broadly to prepolymers, oligomers and both homopolymers and copolymers. It should be noted that the prefix "poly" refers to two or more.

As used herein, the term "phenol" refers broadly to an aromatic ring attached to a hydroxyl group.

As used herein, "coulombic usage" means coulombs per gram of deposited and baked coating.

As stated above, in certain embodiments the present invention is directed to an electrodepositable coating composition comprising a reaction product of an epoxy functional polymer and a cyclic guanidine, and a source of unreacted phenol, wherein the electrodepositable coating composition has a coulombic efficiency of less than 100 coulombs/gram when deposited on a substrate at a supplied current density of ≤1.5 mAmps/cm².

It will be understood that "guanidine," as used herein, refers to a compound, moiety, and/or residue having the following general structure:

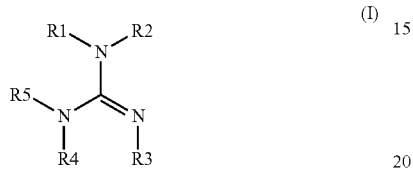

wherein each of R1, R2, R3, R4, R5 (i.e., substituents of structure (I)) can comprise hydrogen, (cyclo)alkyl, aryl, aromatic, organometallic, a polymeric structure, or together can form a cycloalkyl, aryl, or an aromatic structure, and wherein R1, R2, R3, R4, and R5 can be the same or different. As used herein, "(cyclo)alkyl" refers to both alkyl and cycloalkyl. When any of the R groups "together can form a (cyclo)alkyl, aryl, and/or aromatic group" it is meant that any two adjacent R groups are connected to form a cyclic moiety, such as the rings in structures (II)-(V) below.

It will be appreciated that in some embodiments, the double bond between the carbon atom and the nitrogen atom that is depicted in structure (I) may be located between the carbon atom and another nitrogen atom of structure (I). Accordingly, the various substituents of structure (I) may be attached to different nitrogens depending on where the double bond is located within the structure.

In certain embodiments, the cyclic guanidine comprises the guanidine of structure (I) wherein two or more R groups of structure (I) together form one or more rings. In other words, in some embodiments the cyclic guanidine comprises ≥1 ring. For example, the cyclic guanidine can either be a monocyclic guanidine (1 ring) as depicted in structures (II) and/or (III) below, or the cyclic guanidine can be polycyclic (≥2 rings) as depicted in structures (IV) and (V) below.

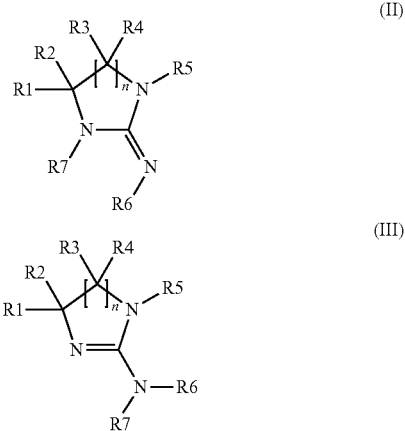

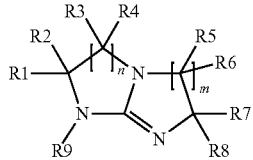

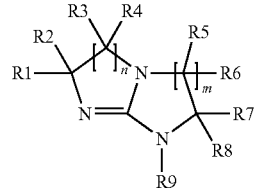

Each substituent of structures (II) and/or (III), R1-R7, can comprise hydrogen, (cyclo)alkyl, aryl, aromatic, ogranometallic, a polymeric structure, or together can form a cycloalkyl, aryl, or an aromatic structure, and wherein R1-R7 can be the same or different. Similarly, each substituent of structures (IV) and (V), R1-R9, can be hydrogen, alkyl, aryl, aromatic, ogranometallic, a polymeric structure, or together can form a cycloalkyl, aryl, or an aromatic structure, and wherein R1-R9 can be the same or different. Moreover, in some embodiments of structures (II) and/or (III), certain combinations of R1-R7 may be part of the same ring structure. For example, R1 and R7 of structure (II) may form part of a single ring structure. Moreover, in some embodiments, it will be understood that any combination of substituents (R1-R7 of structures (II) and/or (III) as well as R1-R9 of structures (IV) and/or (V)) can be chosen so long as the substituents do not substantially interfere with the catalytic activity of the cyclic guandine.

In certain embodiments, each ring in the cyclic guanidine is comprised of ≥5-members. For instance, the cyclic guanidine may be a 5-member ring, a 6-member ring, or a 7-member ring. As used herein, the term "member" refers to an atom located in a ring structure. Accordingly, a 5-member ring will have 5 atoms in the ring structure ("n" and/or "m"=1 in structures (II)-(V)), a 6-member ring will have 6 atoms in the ring structure ("n" and/or "m"=2 in structures (II)-(V)), and a 7-member ring will have 7 atoms in the ring structure ("n" and/or "m"=3 in structures (II)-(V)) It will be appreciated that if the cyclic guanidine is comprised of ≥2 rings (e.g., structures (IV) and (V)), the number of members in each ring of the cyclic guanidine can either be the same or different. For example, one ring may be a five-member ring while the other ring may be a six-member ring. If the cyclic guanidine is comprised of ≥3 rings, then in addition to the combinations cited in the preceding sentence, the number of members in a first ring of the cyclic guanidine can be different from the number of members in any other ring of the cyclic guanidine.

It will also be understood that in certain embodiments of the cyclic guanidine the nitrogen atoms of structures (II)-(V) can further have additional atoms attached thereto. Moreover, in some embodiments, the cyclic guanidine can either be substituted or unsubstituted. For example, as used herein in conjunction with the cyclic guanidine, "substituted", in certain embodiments, refers to a cyclic guanidine wherein R5, R6, and/or R7 of structures (II) and/or (III) and/or R9 of structures (IV) and/or (V) is not hydrogen. As used herein in conjunction with the cyclic guanidine, "unsubstituted", in certain embodiments, refers to a cyclic guanidine wherein R1-R7 of structures (II) and/or (III) and/or R1-R9 of structures (IV) and/or (V) is hydrogen. In some embodiments, the substituted cyclic guanidine is 1,5,7-triazabicyclo[4.4.0]dec-5-ene.

In certain embodiments, the cyclic guanidine may be a curing catalyst for the electrodepositable coating composition. Accordingly, introduction of a cyclic guanidine into an electrodepositable coating composition can reduce and/or eliminate the use of metal catalysts, such as tin and/or bismuth, in an electrodepositable coating composition.

In some embodiments, the cyclic guanidine of the present invention is used in combination with a metal, such as a metal ion, which can be added to the electrodepositable coating composition. Metals that can be used in combination with the cyclic guanidine include, without limitation, bismuth, tin, zinc, zirconium, titanium, manganese, tungsten, yttrium, molybdenum, lanthanum, cobalt, cerium, magnesium, or combinations thereof. It is noted that the oxides and/or salts of the metals recited in the preceding sentence as well as an organo functionalized material comprising one of the metals may also be utilized in the present invention. Moreover, it will be appreciated that some of the metal species are themselves catalysts and, therefore, act as a co-catalyst with the cyclic guanidine. Therefore, the amount of metal catalyst in an electrodepositable coating composition can be reduced by using the cyclic guanidine in combination with a metal.

In some embodiments, the electrodepositable coating composition comprises ≥0.01% or ≥0.2% by weight of the cyclic guanidine, based on the total weight of the resin solids of the electrodepositable coating composition. In other embodiments, the electrodepositable coating composition comprises ≤7% or ≤4% or ≤2 by weight of the cyclic guanidine, based on the total weight of the resin solids of the electrodepositable coating composition. In certain embodiments, the amount of cyclic guanidine present in the electrodepositable coating composition can range between any combination of values, which were recited in the preceding sentences, inclusive of the recited values. For example, in certain embodiments, the electrodepositable coating composition comprises 0.6% to 2.0% by weight of the cyclic guanidine, based on the total weight of the resin solids of the electrodepositable coating composition.

As will be discussed in greater detail below, the cyclic guanidine that is described in the preceding paragraphs can be incorporated into the electrodepositable coating composition using a variety of means. For example, the cyclic guanidine can be: (i) added as an additive to the an electrodepositable coating composition; (ii) incorporated into the main film-forming polymer of an electrodepositable coating composition; (iii) incorporated into the water dispersible polymer of a grind vehicle component of an electrodepositable coating composition; (iv) used to block a curing agent in an electrodepositable coating composition, (v) incorporated into a portion of a crater control additive, (vi) incorporated into a microgel, and/or (vii) used in any combination thereof.

As mentioned above, in certain embodiments, the cyclic guanidine may be a curing catalyst for the electrodepositable coating composition. However, in certain embodiments, the coating composition containing the cyclic guanidine is poorly electrodeposited on a substrate. Without being bound by theory, it may be that the high basicity of cyclic guanidine which enables it to act as a cure catalyst is also responsible for some of the inefficiency in its electrodeposition.

It has been surprisingly discovered that the addition of phenolic compounds to the cyclic guanidine-containing coating composition significantly improves the electrodeposition of the cyclic guanidine-containing coating composition, as demonstrated by improved electrodeposition coating (i.e., a thicker film coverage) of a substrate using less voltage and a lower current density (measured as ampere/area) in a shorter period of time, described in greater detail below.

In certain embodiments of the invention, the electrodepositable coating composition further comprises an unreacted phenol that is added to the cyclic guanidine-containing coating composition described above. In certain embodiments, the unreacted phenol is incorporated into a polymeric resin that is added as an additive or admix to the guanidine-containing composition. In certain embodiments, the unreacted phenol source may be a phenolic hydroxyl group-containing material such as polyhydric phenols such as Bisphenol-A, phloroglucinol, catechol, resorcinol, gallic acid, or tannic acid. Mixtures of alcoholic hydroxyl group-containing materials and phenolic hydroxyl group-containing materials may also be used. Phenolic-containing resins such as novolac resins and resole resins may also be used.

In certain embodiments, the source of unreacted phenol is added to the cyclic guanidine reaction product in an amount of at least 0.5 molar equivalent of the phenolic hydroxy-containing material to 1 equivalent of cyclic guanidine, such as at least 1 equivalent of phenol to 1 equivalent of cyclic guanidine. In certain embodiments, the phenolic material is present in an excess relative the cyclic guanidine reaction product.

Electrodeposition baths are typically supplied as two components: (i) a main vehicle and (ii) a grind vehicle. The first component (main vehicle) can be an unpigmented resin feed which generally comprises a resin blend. In certain embodiments, the resin blend comprises (a) a main film-forming polymer (e.g., an active hydrogen-containing ionic salt group-containing resin) having reactive functional groups, (b) a curing agent that is reactive with functional groups on the film-forming polymer, and (c) any additional water-dispersible non-pigmented components. Wide varieties of main film-forming polymers are known and can be used in the electrodeposition baths of the invention so long as the polymers are "water dispersible." As used herein, "water dispersible" will mean that a material is adapted to be solubilized, dispersed, and/or emulsified in water. The main film-forming polymers used in the invention are ionic in nature. Accordingly, in some embodiments, the main film-forming polymer is cationic. In other words, the main film-forming polymer comprises cationic salt groups, generally prepared by neutralizing a functional group on the film-forming polymer with an acid, which enables the main film-forming polymer to be electrodeposited onto a cathode.

Examples of main film-forming polymers suitable for use in cationic electrocoating coating compositions include, without limitation, cationic polymers derived from a polyepoxide, an acrylic, a polyurethane, and/or polyester, hydroxyl group-containing polymers, amine salt group-containing polymers, or combinations thereof. It should be noted that in some embodiments, that main film-forming polymer is a copolymer of the polymers listed in the preceding sentence.

Accordingly, in some embodiments, the main film-forming polymer is a cationic polymer (cationic resin) that is derived from a polyepoxide. For example, the main film-forming polymer can be prepared by reacting together a polyepoxide and a polyhydroxyl group-containing material selected from alcoholic hydroxyl group-containing materials and phenolic hydroxyl group-containing materials to chain extend or build the molecular weight of the polyepoxide. As will be discussed in greater detail below, the reaction product can then be reacted with a cationic salt group former to produce the cationic polymer.

In certain embodiments, a chain extended polyepoxide typically is prepared as follows: the polyepoxide and polyhydroxyl group-containing material are reacted together "neat" or in the presence of an inert organic solvent such as a ketone, including methyl isobutyl ketone and methyl amyl ketone, aromatics such as toluene and xylene, and glycol ethers such as the dimethyl ether of diethylene glycol. The reaction typically is conducted at a temperature of 80° C. to 160° C. for 30 to 180 minutes until an epoxy group-containing resinous reaction product is obtained.

In some embodiments, the equivalent ratio of reactants (i.e., epoxy:polyhydroxyl group-containing material) ranges from 1.00:0.50 to 1.00:2.00.

In certain embodiments, the polyepoxide typically has at least two 1,2-epoxy groups. The epoxy compounds may be saturated or unsaturated, cyclic or acyclic, aliphatic, alicyclic, aromatic or heterocyclic. Moreover, the epoxy compounds may contain substituents such as halogen, hydroxyl, and ether groups.

Examples of polyepoxides are those having a 1,2-epoxy equivalency greater than one and/or two; that is, polyepoxides which have on average two epoxide groups per molecule. Suitable polyepoxides include polyglycidyl ethers of polyhydric alcohols such as cyclic polyols and polyglycidyl ethers of polyhydric phenols such as Bisphenol A. These polyepoxides can be produced by etherification of polyhydric phenols with an epihalohydrin or dihalohydrin such as epichlorohydrin or dichlorohydrin in the presence of alkali. Besides polyhydric phenols, other cyclic polyols can be used in preparing the polyglycidyl ethers of cyclic polyols. Examples of other cyclic polyols include alicyclic polyols, particularly cycloaliphatic polyols such as hydrogenated bisphenol A, 1,2-cyclohexane diol and 1,2-bis(hydroxymethyl)cyclohexane.

In certain embodiments, the polyepoxides have epoxide equivalent weights ≥180. In some embodiments, the polyepoxides have epoxide equivalent weights ≤2000. In other embodiments, the polyepoxides have epoxide equivalent weights that ranges between any combination of values, which were recited in the preceding sentences, inclusive of the recited values. For example, in certain embodiments the polyepoxides have epoxide equivalent weights ranges from 186 to 1200.

Epoxy group-containing acrylic polymers may also be used in the present invention. In certain embodiments, epoxy group-containing acrylic polymers have an epoxy equivalent weight ≥750. In other embodiments, epoxy group-containing acrylic polymer has an epoxy equivalent weight of ≤2000. In some embodiments, the epoxy group-containing acrylic polymer has an epoxy equivalent weight that ranges between any combination of values, which were recited in the preceding sentences, inclusive of the recited values.

Examples of polyhydroxyl group-containing materials used to chain extend or increase the molecular weight of the polyepoxide (i.e., through hydroxyl-epoxy reaction) include alcoholic hydroxyl group-containing materials and phenolic hydroxyl group-containing materials. Examples of alcoholic hydroxyl group-containing materials are simple polyols such as neopentyl glycol; polyester polyols such as those described in U.S. Pat. No. 4,148,772; polyether polyols such as those described in U.S. Pat. No. 4,468,307; and urethane diols such as those described in U.S. Pat. No. 4,931,157. Examples of phenolic hydroxyl group-containing materials are polyhydric phenols such as Bisphenol A, phloroglucinol, catechol, and resorcinol. Mixtures of alcoholic hydroxyl group-containing materials and phenolic hydroxyl group-containing materials may also be used.

The main film-forming polymer can contain cationic salt groups, which can be incorporated into the resin molecule as follows: The resinous reaction product prepared as described above is further reacted with a cationic salt group former. By "cationic salt group former" is meant a material which is reactive with epoxy groups and which can be acidified before, during, or after reaction with the epoxy groups to form cationic salt groups. Examples of suitable materials include amines such as primary or secondary amines which can be acidified after reaction with the epoxy groups to form amine salt groups, or tertiary amines which can be acidified prior to reaction with the epoxy groups and which after reaction with the epoxy groups form quaternary ammonium salt groups. Examples of other cationic salt group formers are sulfides which can be mixed with acid prior to reaction with the epoxy groups and form ternary sulfonium salt groups upon subsequent reaction with the epoxy groups.

When amines are used as the cationic salt formers, monoamines, hydroxyl-containing amines, polyamines, or combinations thereof may be used.

Tertiary and secondary amines are used more often than primary amines because primary amines are polyfunctional with respect to epoxy groups and have a greater tendency to gel the reaction mixture. If polyamines or primary amines are used, they can be used in a substantial stoichiometric excess to the epoxy functionality in the polyepoxide so as to prevent gelation and the excess amine can be removed from the reaction mixture by vacuum stripping or other technique at the end of the reaction. The epoxy may be added to the amine to ensure excess amine.

Examples of hydroxyl-containing amines include, but are not limited to, alkanolamines, dialkanolamines, alkyl alkanolamines, and aralkyl alkanolamines containing from 1 to 18 carbon atoms, such as 1 to 6 carbon atoms, in each of the alkanol, alkyl and aryl groups. Specific examples include ethanolamine, N-methylethanolamine, diethanolamine, N-phenylethanolamine, N,N-dimethylethanolamine, N-methyldiethanolamine, 3-aminopropyldiethanolamine, and N-(2-hydroxyethyl)-piperazine.

Amines such as mono, di, and trialkylamines and mixed aryl-alkyl amines which do not contain hydroxyl groups or amines substituted with groups other than hydroxyl which do not negatively affect the reaction between the amine and the epoxy may also be used. Specific examples include ethylamine, methylethylamine, triethylamine, N-benzyldimethylamine, dicocoamine, 3-dimethylaminopropylamine, and N,N-dimethylcyclohexylamine.

Mixtures of the above mentioned amines may also be used in the present invention.

The reaction of a primary and/or secondary amine with the polyepoxide takes place upon mixing of the amine and polyepoxide. The amine may be added to the polyepoxide or vice versa. The reaction can be conducted neat or in the presence of a suitable solvent such as methyl isobutyl ketone, xylene, or 1-methoxy-2-propanol. The reaction is generally exothermic and cooling may be desired. However, heating to a moderate temperature ranging from 50° C. to 150° C. may be done to hasten the reaction.

The reaction product of the primary and/or secondary amine and the polyepoxide is made cationic and water dispersible by at least partial neutralization with an acid. Suitable acids include organic and inorganic acids. Non-limiting examples of suitable organic acids include formic acid, acetic acid, methanesulfonic acid, and lactic acid. Non-limiting examples of suitable inorganic acids include phosphoric acid and sulfamic acid. By "sulfamic acid" is meant sulfamic acid itself or derivatives thereof such as those having the formula:

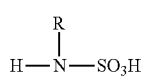

wherein R is hydrogen or an alkyl group having 1 to 4 carbon atoms.

It is noted that mixtures of the above mentioned acids may also be used may be used in the present invention.

The extent of neutralization of the cationic electrodepositable coating composition varies with the particular reaction product involved. However, sufficient acid should be used to disperse the electrodepositable coating composition in water. Typically, the amount of acid used provides at least 20 percent of all of the total neutralization. Excess acid may also be used beyond the amount required for 100 percent total neutralization. For example, in some embodiments, the amount of acid used to neutralize the electrodepositable coating composition is ≥1% based on the total amines in the electrodepositable coating composition. In other embodiments, the amount of acid used to neutralize the electrodepositable coating composition is ≤100% based on the total amines in the electrodepositable coating composition. In certain embodiments, the total amount of acid used to neutralize the electrodepositable coating composition ranges between any combination of values, which were recited in the preceding sentences, inclusive of the recited values. For example, the total amount of acid used to neutralize the electrodepositable coating composition can be 20%, 35%, 50%, 60%, or 80% based on the total amines in the electrodepositable coating composition.

In the reaction of a tertiary amine with a polyepoxide, the tertiary amine can be pre-reacted with the neutralizing acid to form the amine salt and then the amine salt reacted with the polyepoxide to form a quaternary salt group-containing resin. The reaction is conducted by mixing the amine salt with the polyepoxide in water. Typically, the water is present in an amount ranging from 1.75% to 20% by weight based on total reaction mixture solids.

In forming the quaternary ammonium salt group-containing resin, the reaction temperature can be varied from the lowest temperature at which the reaction will proceed, generally room temperature or slightly thereabove, to a maximum temperature of 100° C. (at atmospheric pressure). At higher pressures, higher reaction temperatures may be used. In some embodiments, the reaction temperature ranges from 60° C. to 100° C. Solvents such as a sterically hindered ester, ether, or sterically hindered ketone may be used, but their use is not necessary.

In addition to the primary, secondary, and tertiary amines disclosed above, a portion of the amine that is reacted with the polyepoxide can be a ketimine of a polyamine, such as is described in U.S. Pat. No. 4,104,147, column 6, line 23 to column 7, line 23. The ketimine groups decompose upon dispersing the amine-epoxy resin reaction product in water. In an embodiment of the present invention, at least a portion of the active hydrogens present in the resin (a) comprise primary amine groups derived from the reaction of a ketimine-containing compound and an epoxy group-containing material such as those described above.

In addition to resins containing amine salts and quaternary ammonium salt groups, cationic polymers containing ternary sulfonium groups may be used in the composition of the present invention. Examples of these resins and their method of preparation are described in U.S. Pat. Nos. 3,793,278 and 3,959,106.

Suitable active hydrogen-containing, cationic salt group-containing resins can include copolymers of one or more alkyl esters of acrylic acid or (meth)acrylic acid optionally together with one or more other polymerizable ethylenically unsaturated monomers. Suitable alkyl esters of acrylic acid or (meth)acrylic acid include methyl(meth)acrylate, ethyl (meth)acrylate, butyl(meth)acrylate, ethyl acrylate, butyl acrylate, and 2-ethyl hexyl acrylate. Suitable other copolymerizable ethylenically unsaturated monomers include nitriles such acrylonitrile and (meth)acrylonitrile, vinyl and vinylidene halides such as vinyl chloride and vinylidene fluoride and vinyl esters such as vinyl acetate. Acid and anhydride functional ethylenically unsaturated monomers such as acrylic acid, (meth)acrylic acid or anhydride, itaconic acid, maleic acid or anhydride, or fumaric acid may be used. Amide functional monomers including acrylamide, (meth)acrylamide, and N-alkyl substituted (meth)acrylamides are also suitable. Vinyl aromatic compounds such as styrene and vinyl toluene can be used so long as a high level of photodegradation resistance of the polymer is not required.

Functional groups such as hydroxyl and amino groups can be incorporated into the acrylic polymer by using functional monomers such as hydroxyalkyl acrylates and methacrylates or aminoalkyl acrylates and methacrylates. Epoxide functional groups (for conversion to cationic salt groups) may be incorporated into the acrylic polymer by using functional monomers such as glycidyl acrylate and methacrylate, 3,4-epoxycyclohexylmethyl(meth)acrylate, 2-(3,4-epoxycyclohexyl)ethyl(meth)acrylate, or allyl glycidyl ether. Alternatively, epoxide functional groups may be incorporated into the acrylic polymer by reacting carboxyl groups on the acrylic polymer with an epihalohydrin or dihalohydrin such as epichlorohydrin or dichlorohydrin.

The acrylic polymer can be prepared by traditional free radical initiated polymerization techniques, such as solution or emulsion polymerization, as known in the art, using suitable catalysts which include organic peroxides and azo type compounds and optionally chain transfer agents such as alpha-methyl styrene dimer and tertiary dodecyl mercaptan. Additional acrylic polymers which are suitable for forming the active hydrogen-containing, cationic polymer and which can be used in the electrodepositable coating compositions of the present invention include those resins described in U.S. Pat. Nos. 3,455,806 and 3,928,157.

As stated above, the main film-forming polymer can also be derived from a polyurethane. Among the polyurethanes which can be used are polymeric polyols which are prepared by reacting polyester polyols or acrylic polyols such as those mentioned above with a polyisocyanate such that the OH/NCO equivalent ratio is greater than 1:1 so that free hydroxyl groups are present in the product. Smaller polyhydric alcohols such as those disclosed above for use in the preparation of the polyester may also be used in place of or in combination with the polymeric polyols.

Additional examples of polyurethane polymers suitable for forming the active hydrogen-containing, cationic polymer include the polyurethane, polyurea, and poly(urethane-urea) polymers prepared by reacting polyether polyols and/or polyether polyamines with polyisocyanates. Such polyurethane polymers are described in U.S. Pat. No. 6,248,225.

Epoxide functional groups may be incorporated into the polyurethane by methods well known in the art. For example, epoxide groups can be incorporated by reacting glycidol with free isocyanate groups.

Sulfonium group-containing polyurethanes can also be made by at least partial reaction of hydroxy-functional sulfide compounds, such as thiodiglycol and thiodipropanol, which results in incorporation of sulfur into the backbone of the polymer. The sulfur-containing polymer is then reacted with a monofunctional epoxy compound in the presence of acid to form the sulfonium group. Appropriate monofunctional epoxy compounds include ethylene oxide, propylene oxide, glycidol, phenylglycidyl ether, and CARDURA E, available from Resolution Performance Products.

In addition to being derived from a polyepoxide or a polyurethane, the main film-forming polymer can also be derived from a polyester. Such polyesters can be prepared in a known manner by condensation of polyhydric alcohols and polycarboxylic acids. Suitable polyhydric alcohols include, for example, ethylene glycol, propylene glycol, butylene glycol, 1,6-hexylene glycol, neopentyl glycol, diethylene glycol, glycerol, trimethylol propane, and pentaerythritol. Examples of suitable polycarboxylic acids used to prepare the polyester include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Moreover, hydroxy acids and/or lactones, such as caprolactone and/or 12-hydroxystearic acid, may also be used as components of the polyester.

The polyesters contain a portion of free hydroxyl groups (resulting from the use of excess polyhydric alcohol and/or higher polyols during preparation of the polyester) which are available for cure reactions.

Epoxide functional groups may be incorporated into the polyester by reacting carboxyl groups on the polyester with an epihalohydrin or dihalohydrin such as epichlorohydrin or dichlorohydrin. Alternatively, in some embodiments, an acid functional polyester can be incorporated into an epoxy polymer by reaction of carboxyl groups with an excess of polyepoxide.

Sulfonium salt groups can be introduced by the reaction of an epoxy group-containing polymer of the types described above with a sulfide in the presence of an acid, as described in U.S. Pat. Nos. 3,959,106 and 4,715,898. Sulfonium groups can be introduced onto the polyester backbones described using similar reaction conditions.

In some embodiments, the main film-forming polymer further comprises cationic amine salt groups which are derived from pendant and/or terminal amino groups. By "terminal and/or pendant" is meant that primary and/or secondary amino groups are present as a substituent which is pendant from or in the terminal position of the polymeric backbone, or, alternatively, is an end-group substituent of a group which is pendant and/or terminal from the polymer backbone. In other words, the amino groups from which the cationic amine salt groups are derived are not required to be within the polymeric backbone. The pendant and/or terminal amino groups can have the following structures (I) or (II):

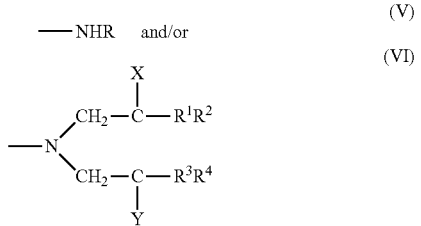

wherein R represents H or $C_1$ to $C_{18}$ alkyl; $R^1$, $R^2$, $R^3$, and $R^4$ are the same or different, and each independently represents H or $C_1$ to $C_4$ alkyl; and X and Y can be the same or different, and each independently represents a hydroxyl group and/or an amino group.

As used in conjunction with structures (V) and (VI), "alkyl" is meant alkyl and aralkyl, cyclic or acyclic, linear or branched monovalent hydrocarbon groups. The alkyl groups can be unsubstituted or substituted with one or more heteroatoms, for example, non-carbon, non-hydrogen atoms such as one or more oxygen, nitrogen or sulfur atoms.

The pendant and/or terminal amino groups represented by structures (V) and (VI) above can be derived from a compound selected from the group consisting of ammonia, methylamine, diethanolamine, diisopropanolamine, N-hydroxyethyl ethylenediamine, diethylenetriamine, and mixtures thereof. One or more of these compounds is reacted with one or more of the above described polymers, for example, a polyepoxide polymer, where the epoxy groups are ring-opened via reaction with a polyamine, thereby providing terminal amino groups and secondary hydroxyl groups.

In some embodiments, the terminal amino groups has structure (VI) wherein both X and Y comprise primary amino groups (e.g., the amino group is derived from diethylenetriamine). It should be understood that in this instance, prior to reaction with the polymer, the primary amino groups can be blocked, for example, by reaction with a ketone such as methyl isobutyl ketone, to form the diketimine. Such ketimines are those described in U.S. Pat. No. 4,104,147, column 6, line 23 to column 7, line 23. The ketimine groups can decompose upon dispersing the amine-epoxy reaction product in water, thereby providing free primary amine groups as curing reaction sites.

In certain embodiments, the amines from which the pendant and/or terminal amino groups are derived comprise primary and/or secondary amine groups such that the active hydrogens of said amines will be consumed by reaction with the at least partially blocked aliphatic polyisocyanate curing agent to form urea groups or linkages during the curing reaction.

It should be understood that, in some embodiments, the active hydrogens associated with the main film-forming polymer include any active hydrogens which are reactive with isocyanates at temperatures sufficient to cure the electrodepositable coating composition as previously discussed (i.e., at temperatures at or below 182.2° C. (360° F.)). The active hydrogens typically are derived from reactive hydroxyl groups, and primary and secondary amino, including mixed groups such as hydroxyl and primary amino. In some embodiments of the present invention, at least a portion of the active hydrogens are derived from hydroxyl groups comprising phenolic hydroxyl groups. In some embodiments, the main film-forming polymer has an active hydrogen content of ≥1 milliequivalents of active hydrogen per gram of resin solids. In other embodiments, the main film-forming polymer has an active hydrogen content of ≤4 milliequivalents of active hydrogen per gram of resin solids. In certain embodiments, the main film-forming polymer has an active hydrogen content ranging between any combination of values, which were recited in the preceding sentences, inclusive of the recited values. For example, in some embodiments, the main film-forming polymer has an active hydrogen content ranging from 2 to 3 milliequivalents of active hydrogen per gram of resin solids.

The extent of cationic salt group formation should be such that when the resin is mixed with an aqueous medium and other ingredients, a stable dispersion of the electrodepositable coating composition will form. By "stable dispersion" is meant one that does not settle or is easily redispersible if some settling occurs. Moreover, the dispersion should be of sufficient cationic character that the dispersed resin particles will electrodeposit on a cathode when an electrical potential is set up between an anode and a cathode immersed in the aqueous dispersion.

In certain embodiments, the main film-forming polymer in the electrodepositable coating composition of the present invention comprises ≥0.1 milliequivalents of cationic salt group per gram of resin solids. In other embodiments, the main film-forming polymer comprises ≤3.0 milliequivalents of cationic salt group per gram of resin solids. In some embodiments, the milliequivalents of cationic salt group per gram of resin solids in the main film-forming polymer ranges between any combination of values, which were recited in the preceding sentences, inclusive of the recited values. For example, in some embodiments, the electrodepositable coating composition comprises from 0.1 to 0.7 milliequivalents of cationic salt group per gram of resin solids.

Moreover, in some embodiments, the main film-forming polymer typically is non-gelled, having a number average molecular weight ≥2000. In other embodiments, the main film-forming polymer is non-gelled and has a number average molecular weight of ≤15,000. In certain embodiments, the average molecular weight of the main film-forming polymer ranges between any combination of values, which were recited in the preceding sentences, inclusive of the recited values. For example, in some embodiments, the average molecular weight of the main film-forming polymer ranges from 5000 to 10,000. As used herein, "non-gelled" means a polymer that is substantially free from crosslinking, and prior to cationic salt group formation, the resin has a measurable intrinsic viscosity when dissolved in a suitable solvent. In contrast, a gelled resin, having an essentially infinite molecular weight, would have an intrinsic viscosity too high to measure.

In certain embodiments, the main film-forming polymer is present in the electrodepositable coating composition in an amount ≥40% by weight based on weight of total resin solids present in the electrodepositable coating composition. In other embodiments, the main film-forming polymer is present the electrodepositable coating composition in an amount ≤95% by weight based on weight of total resin solids present in the electrodepositable coating composition. In some embodiments, the weight percent of the main film-forming polymer in the electrodepositable coating composition ranges between any combination of values, which were recited in the preceding sentences, inclusive of the recited values. For example, the main film-forming polymer is present in the electrodepositable coating composition in an amount ranging from 50% to 75% by weight based on weight of total resin solids present in the electrodepositable coating composition.

In some embodiments, the main film-forming polymers can be selected from cationic acrylic polymers such as those described in U.S. Pat. Nos. 3,455,806 and 3,928,157. In some embodiments, the main film-forming polymer can be selected from the polymers described in U.S. Pat. Nos. 6,165,338 and 4,543,376, which are incorporated herein by reference. In certain embodiments, the main film-forming polymers can be selected from hydroxy group-containing polymers including, without limitation, the reaction products of: (i) bisphenol A and ethylene oxide, (ii) bisphenol A and propylene oxide, (iii) bisphenol A and polyethylene oxide and/or polypropylene oxide diamines, and/or (iv) bisphenol A and bisphenol A diglycidal either. In other embodiments, the main film-forming polymers can be amine salt group-containing polymers including, without limitation, the acid-solubilized reaction products of polyepoxides and primary or secondary amines such as those described in U.S. Pat. Nos. 3,663,389; 3,984,299; 3,947,338; 3,947,339; and 4,116,900. Suitable primary or secondary amines include, without limitation, methyl ethanol amine, diethanolamine, diethylene triamine diketimine, diethyl amine, dimethyl amine, other di alkyl amines, amino propyl diethanols amine, or combinations thereof. Usually, these amine salt group-containing polymers are used in combination with a blocked isocyanate curing agent. The isocyanate can be fully blocked as described in the aforementioned U.S. Pat. No. 3,984,299 or the isocyanate can be partially blocked and reacted with the polymer backbone such as described in U.S. Pat. No. 3,947,338. Also, one-component compositions as described in U.S. Pat. No. 4,134,866 and DE-OS No. 2,707,405 can be used as the film-forming resin.

Besides amine salt group-containing polymers, quaternary ammonium salt group-containing polymers can also be employed. Examples of these polymers are those which are formed by reacting an organic polyepoxide with a tertiary amine salt. Such polymers are described in U.S. Pat. Nos. 3,962,165; 3,975,346; and 4,001,101. Examples of other cationic polymers are ternary sulfonium salt group-containing polymers and quaternary phosphonium salt-group containing polymers such as those described in U.S. Pat. Nos. 3,793,278 and 3,984,922, respectively. Also, film-forming polymers which cure via transesterification such as described in European Application No. 12463 can be used. Further, cationic compositions prepared from Mannich bases such as described in U.S. Pat. No. 4,134,932 can be used.

As stated above, in addition to the (a) main film-forming polymer, the resin blend further comprises (b) a curing agent (crosslinker) that is reactive with reactive functional groups, such as active hydrogen groups, on the main film-forming polymer. The curing agents that may be used with the present invention include, but is not limited to, urethane, isocyanate, ester, or combinations thereof.

It will be understood that non-limiting examples of urethane curing agents include the products of (i) an amine-carbonate reaction and/or (ii) an isocyanate-alcohol reaction.

Non-limiting examples of suitable cyclic carbonates that can be utilized to form the urethane curing agent, include, without limitation, propylene carbonate, ethylene carbonate, butylene carbonate, or combinations thereof. Non-limiting examples of suitable acyclic carbonates that can be utilized to form the urethane, include, without limitation, dimethyl carbonate, diethyl carbonate, methylethyl carbonate, dipropyl carbonate, methylpropyl carbonate, dibutyl carbonate, or combinations thereof. In some embodiments of the present invention, the acyclic carbonate comprises dimethyl carbonate. Non-limiting examples of suitable amines that can be utilized to form the urethane, include, without limitation, diethylene triamine, dipropylene triamine, bis-hexamethylene triamine, isophorone diamine, 4'-bis-aminocyclohexylamine, xylylene diamine, N-hydroxyethyl ethylene diamine, hexamethylene triamine, trisaminoethylamine, or combinations thereof. In some embodiments, the curing agent is a reaction product of a polyamine and a cyclic carbonate. It will be understood that in certain embodiments, the primary amines of the polyamine are reacted with the cyclic carbonate. In some embodiments of the present invention, the reaction product of the polyamine and the cyclic carbonate can then be reacted with an epoxy functional polymer such as those used to prepare the main vehicle and/or grind vehicle. Specifically, in some embodiments, the secondary amine of the reaction product is reacted with the epoxy functional group of the epoxy functional polymer.

Non-limiting examples of suitable isocyanates that can be utilized to form the urethane curing agent include, without limitation, toluene diisocyanate, methylene diphenyl 4,4'-diisocyanate, isophorone diisocyanate, hexamethylene diisocyanate, xylyleuediisocyanate, tetramethylxylylene diisocyanate, straight chain aliphatic diisocyanates such as 1,4-tetramethylene diisocyanate, norbornane diisocyanate, and 1,6-hexamethylene diisocyanate, isophorone diisocyanate and 4,4'-methylene-bis-(cyclohexyl isocyanate), aromatic diisocyanates such as p-phenylene diisocyanate, diphenylmethane-4,4'-diisocyanate and 2,4- or 2,6-toluene diisocyanate, higher polyisocyanates such as triphenylmethane-4,4',4"-triisocyanate, 1,2,4-benzene triisocyanate and polymethylene polyphenyl isocyanate, and trimers of 1,6-hexamethylene diisocyanate, or combinations thereof. It should be noted that the dimers, trimers and higher functional materials of these isocyanates may also be utilized in the present invention. Non-limiting examples of suitable alcohols that can be utilized to form the urethane include, without limitation, methanol, ethanol, propanol, isopropanol, butanol, glycol ethers, and other alcohols.

As stated above, suitable curing agents for amine salt group-containing polymers, cationic acrylic polymers, and/or hydroxy group-containing polymers include isocyanates as well as blocked isocyanates. It should be noted that as used herein, "isocyanates" also includes polyisocyanates and vice versa. The polyisocyanate curing agent may be a fully blocked polyisocyanate with substantially no free isocyanate groups, or it may be partially blocked and reacted with the resin backbone as described in U.S. Pat. No. 3,984,299. The polyisocyanate can be an aliphatic, an aromatic polyisocyanate, or combinations thereof. In some embodiments, diisocyanates are utilized, although in other embodiments higher polyisocyanates can be used in place of or in combination with diisocyanates.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used. A mixture of diphenylmethane-4,4'-diisocyanate and polymethylene polyphenyl isocyanate can be used.

Any suitable alcohol or polyol can be used as a blocking agent for the polyisocyanate in the electrodepositable coating composition of the present invention provided that the agent will deblock at the curing temperature and provided a gelled product is not formed. For example, suitable alcohols include, without limitation, methanol, ethanol, propanol, isopropyl alcohol, butanol, 2-ethylhexanol, butoxyethanol, hexyloxyethanol, 2-ethylhexyloxyethanol, n-butanol, cyclohexanol phenyl carbinol, methylphenyl carbinol, ethylene glycol monobutyl ether, diethylene glycol monobutylether, ethylene glycol monomethylether, propylene glycol monomethylether, or combinations thereof.

In certain embodiments of the present invention, the blocking agent comprises one or more 1,3-glycols and/or 1,2-glycols. In one embodiment of the present invention, the blocking agent comprises one or more 1,2-glycols, typically one or more $C_3$ to $C_6$ 1,2-glycols. For example, the blocking agent can be selected from at least one of 1,2-propanediol, 1,3-butanediol, 1,2-butanediol, 1,2-pentanediol, trimethylpentene diol, and/or 1,2-hexanediol.

Other suitable blocking agents include oximes such as methyl ethyl ketoxime, acetone oxime and cyclohexanone oxime and lactams such as epsilon-caprolactam.

As stated above, in some embodiments, the curing agent that is used in the present invention is an ester curing agent. It should be noted that as used herein, "ester" also includes polyesters. Accordingly, in some embodiments, a polyester curing agent. Suitable polyester curing agents include materials having greater than one ester group per molecule. The ester groups are present in an amount sufficient to effect cross-linking, for example at temperatures up to 250° C., and curing times of up to 90 minutes. It should be understood that acceptable cure temperatures and cure times will be dependent upon the substrates to be coated and their end uses.

Compounds generally suitable as the polyester curing agent are polyesters of polycarboxylic acids. Non-limiting examples include bis(2-hydroxyalkyl)esters of dicarboxylic acids, such as bis(2-hydroxybutyl) azelate and bis(2-hydroxyethyl)terephthalate; tri(2-ethylhexanoyl)trimellitate; and poly(2-hydroxyalkyl)esters of acidic half-esters prepared from a dicarboxylic acid anhydride and an alcohol, including polyhydric alcohols. The latter type is suitable to provide a polyester with a final functionality of more than 2. One suitable example includes a polyester prepared by first reacting equivalent amounts of the dicarboxylic acid anhydride (e.g., succinic anhydride or phthalic anhydride) with a trihydric or tetrahydric alcohol, such as glycerol, trimethylolpropane or pentaerythritol, at temperatures below 150° C., and then reacting the acidic polyester with at least an equivalent amount of an epoxy alkane, such as 1,2-epoxy butane, ethylene oxide, or propylene oxide. The polyester curing agent (ii) can comprise an anhydride. Another suitable polyester comprises a lower 2-hydroxy-alkylterminated poly-alkyleneglycol terephthalate.

In some embodiments, the polyester comprises at least one ester group per molecule in which the carbon atom adjacent to the esterified hydroxyl has a free hydroxyl group.

Also suitable is the tetrafunctional polyester prepared from the half-ester intermediate prepared by reacting trimellitic anhydride and propylene glycol (molar ratio 2:1), then reacting the intermediate with 1,2-epoxy butane and the glycidyl ester of branched monocarboxylic acids.

In some embodiments, where the active hydrogen-containing resin comprises cationic salt groups, the polyester curing agent is substantially free of acid. For purposes of the present invention, by "substantially free of acid" is meant having less than 0.2 meq/g acid. For aqueous systems, for example for cathodic electrocoating, coating compositions, suitable polyester curing agents can include non-acidic polyesters prepared from a polycarboxylic acid anhydride, one or more glycols, alcohols, glycol mono-ethers, polyols, and/or monoepoxides.

Suitable polycarboxylic anhydrides can include dicarboxylic acid anhydrides, such as succinic anhydride, phthalic anhydride, tetrahydrophthalic anhydride, trimellitic anhydride, hexahydrophthalic anhydride, methylhexahydrophthalic anhydride, 3,3',4,4'-benzophenonetetracarboxylic dianhydride, and pyromellitic dianhydride. Mixtures of anhydrides can be used.

Suitable alcohols can include linear, cyclic or branched alcohols. The alcohols may be aliphatic, aromatic or araliphatic in nature. As used herein, the terms glycols and mono-epoxides are intended to include compounds containing not more than two alcohol groups per molecule which can be reacted with carboxylic acid or anhydride functions below the temperature of 150° C.

Suitable mono-epoxides can include glycidyl esters of branched monocarboxylic acids. Further, alkylene oxides, such as ethylene oxide or propylene oxide may be used. Suitable glycols can include, for example ethylene glycol and polyethylene glycols, propylene glycol and polypropylene glycols, and 1,6-hexanediol. Mixtures of glycols may be used.

Non-acidic polyesters can be prepared, for example, by reacting, in one or more steps, trimellitic anhydride (TMA) with glycidyl esters of branched monocarboxylic acids in a molar ratio of 1:1.5 to 1:3, if desired with the aid of an esterification catalyst such as stannous octoate or benzyl dimethyl amine, at temperatures of 50-150° C. Additionally, trimellitic anhydride can be reacted with 3 molar equivalents of a monoalcohol such as 2-ethylhexanol.

Alternatively, trimellitic anhydride (1 mol) can be reacted first with a glycol or a glycol monoalkyl ether, such as ethylene glycol monobutyl ether in a molar ratio of 1:0.5 to 1:1, after which the product is allowed to react with 2 moles of glycidyl esters of branched monocarboxylic acids. Furthermore, the polycarboxylic acid anhydride i.e., those containing two or three carboxyl functions per molecule) or a mixture of polycarboxylic acid anhydrides can be reacted simultaneously with a glycol, such as 1,6-hexane diol and/or glycol mono-ether and monoepoxide, after which the product can be reacted with mono-epoxides, if desired. For aqueous compositions these non-acid polyesters can also be modified with polyamines such as diethylene triamine to form amide polyesters. Such "amine-modified" polyesters may be incorporated in the linear or branched amine adducts described above to form self-curing amine adduct esters.

The non-acidic polyesters of the types described above typically are soluble in organic solvents, and typically can be mixed readily with the main film forming resin described above.

Polyesters suitable for use in an aqueous system or mixtures of such materials disperse in water typically in the presence of resins comprising cationic salt groups.

In some embodiments, the polyisocyanate curing agents are typically utilized in conjunction with the cationic main film-forming polymers in amounts of ≥5% by weight based on the total weight of the resin solids of the electrodeposition bath. In other embodiments, the polyisocyanate curing agents are typically utilized in conjunction with the cationic main film-forming polymers in amounts of ≤60% by weight based on the total weight of the resin solids of the electrodeposition bath. In yet other embodiments, the amount of main film-forming polymer can range between any combination of values, which were recited in the preceding sentences, inclusive of the recited values. For example, the polyisocyanate curing agents can be utilized in conjunction with the cationic main film-forming polymers in an amount ranting from 20% to 50% by weight based on the total weight of the resin solids of the electrodeposition bath.

In some embodiments, the curing agent that can be used in the electrocoating composition is the curing agent that is described in U.S. Pat. No. 5,902,473, which is incorporated herein by reference.

It is understood that one skilled in the art can determine an appropriate curing agent for a particular main film-forming polymer based on the functionality of the main film-forming polymer.

In certain embodiments, at least a portion of the curing agent is chemically bound to the main film-forming polymer. In other embodiments, the curing agent is not chemically bound to the main film-forming polymer and is added as an additive to the electrodepositable coating composition.

The second component (grind vehicle) of an electrodeposition bath generally comprises a pigment composition (pigment paste), which can have one or more pigments, a water dispersible polymer, and, optionally, additives such as surfactants, wetting agents, catalysts, dispersing aids, or combinations thereof. It should be noted that the water dispersible polymer of the grind vehicle can either be the same or different from the main film-forming polymer in the resin blend. The pigment composition used in the grind vehicle may be of the conventional type comprising pigments of, for example, iron oxides, strontium chromate, carbon black, coal dust, titanium dioxide, talc, barium sulfate, as well as color pigments such as cadmium yellow, cadmium red, chromium yellow and the like. In some embodiments, the pigment composition can comprise effect pigments such as, but not limited to, electroconductive and/or photo chromic pigments. The pigment content of the dispersion is usually expressed as a pigment-to-resin ratio. In the practice of the invention, when pigment is employed, the pigment-to-resin ratio is usually within the range of about 0.02:1 to 1:1. The other additives mentioned above are usually in the dispersion in amounts of about 0.01% to 3% by weight based on weight of resin solids.

The first and second components of the electrodeposition bath are dispersed together in an aqueous medium which comprises water and, usually, coalescing solvents to form the electrodeposition bath. Useful coalescing solvents that can be used in the electrodeposition bath include, but are not limited to, hydrocarbons, alcohols, esters, ethers and/or ketones. In one embodiment, the coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol. In certain embodiments, the amount of coalescing solvent used in the electrodeposition bath is ≥0.01% weight based on the total weight of the aqueous medium used to make the electrodeposition bath. In other embodiments, the amount of coalescing solvent used in the electrodeposition bath is ≤25% by weight based on the total weight of the aqueous medium used to make the electrodeposition bath. In yet other embodiments, the amount of coalescing solvent used in the electrodeposition bath can range between any combination of values, which were recited in the preceding sentences, inclusive of the recited values. For example, in one embodiment, the amount of coalescing solvent used in the electrodeposition bath can range from 0.05% to 5% by weight based on the total weight of the aqueous medium used to make the electrodeposition bath.

As stated above, in certain embodiments, the cyclic guanidine and/or the unreacted phenol can be in the form of an additive that is added to an electrodepositable coating composition. In some embodiments, the additive is added "neat", that is, added directly into the electrodepositable coating composition without prior blending or reacting with the other components that comprise the electrodepositable coating composition. For example, in some embodiments, the additive is added "neat" into an electrodeposition bath and/or to components that are used to form the electrodeposition bath (e.g., resin blend and/or grind vehicle). In other embodiments, the additive is added to an aqueous medium prior to the aqueous medium being added to the electrodeposition bath. For instance, the additive can be added to an aqueous medium, which is added to the electrodeposition bath, after the electrodeposition bath has been prepared (i.e., post added). In some embodiments, the additive is added "neat" into the resin blend and/or into the grind vehicle before the resin blend and/or the grind vehicle is dispersed in an aqueous medium. In other words, the additive can be added to the resin blend and/or to the grind vehicle prior to the formation of the electrodeposition bath. The preparation of such an additive will be discussed in greater detail in the Examples section below.

In certain embodiments, additive that is added to the electrodepositable coating composition comprises a reaction product of the cyclic guanidine and a monofunctional compound or an admix comprising an unreacted phenol and a monofunctional compound. Suitable monofunctional compounds include, without limitation, phenyl glycidyl or 2-ethyl hexyl glycidyl ether.

In certain embodiments, the cyclic guanidine of the present invention is incorporated into the resin blend and/or the grind vehicle as part of an admixture that comprises the cyclic guanidine and the unreacted phenol. It will be appreciated that the cyclic guanidine as well as the additional component are both reactive with a functional group on the main film-forming polymer and/or the water dispersible polymer of the resin blend and/or grind vehicle, respectively.

Moreover, in some embodiments, the cyclic guanidine of the present invention is incorporated into the resin blend and/or the grind vehicle as part of an admixture that comprises the cyclic guanidine and an additional component. It will be appreciated that the cyclic guanidine as well as the additional component are both reactive with a functional group on the main film-forming polymer and/or the water dispersible polymer of the resin blend and/or grind vehicle, respectively. In some embodiments, the additional component is an "amine package" that is added to the resin blend and/or the grind vehicle. As used herein, "amine package" refers to an admixture of amines, such as, without limitation, polyamines, primary amines, secondary amines, amine-carbamates, tertiary amines, or combinations thereof.

In other embodiments, the additional component can include a sulfide or a combination of an amine package and a sulfide. Suitable sulfides that can be utilized in the present invention include, but are not limited to, hydroxy functional sulfides, such as thiodiethanol.

In certain embodiments, the additional component comprises other functional groups such as, without limitation, alcohols, tertiary amines, urethanes, ureas, ketimines, carbamates, or combinations thereof.

In some embodiments, the carbamate functional group is a reaction product of a polyamine and a carbonate, such as a cyclic carbonate. Suitable polyamines that can be utilized to form the carbamate include, without limitation, diethylene triamine, dipropylene triamine, bis-hexamethylene triamine, isophorone diamine, 4'-bis-aminocyclohexylamine, xylylene diamine, N-hydroxyethyl ethylene diamine, hexamethylene triamine, trisaminoethylamine, or combinations thereof. In certain embodiments, the polyamine comprises primary and/or secondary amines. Suitable carbonates that can be utilized to form the carbamate include, without limitation, ethylene carbonate, propylene carbonate, butylene carbonate, or mixtures thereof.

In some embodiments, the additional component comprises a reaction product of a polyamine and a carbonate. The polyamines and carbonates which are listed in the preceding paragraph are suitable for use in forming such a reaction product. In certain embodiments, the polyamine comprises a primary amine and a secondary amine. In some embodiments, at least a portion of the primary amine of the polyamine is reacted with a cyclic carbonate to form a carbamate.

In some embodiments, the cyclic guanidine is the only component of the admixture that reacts with the polymer of the resin blend and/or the grind vehicle. In certain embodiments, the unreacted phenol is added to the cyclic guanidine reaction product in the resin blend and/or the grind vehicle.

As stated above, in certain embodiments, the cyclic guanidine and/or the unreacted phenol source can be incorporated into a polymer, such as the main film-forming polymer and/or the water dispersible polymer of the grind vehicle, of an electrodepositable coating composition. For clarity, the main film-forming polymer and the water dispersible polymer of the grind vehicle will generally be referred to as a "polymer." For example, the cyclic guanidine can be incorporated into a polymer via a reaction between the cyclic guanidine and a functional group on the polymer. In some embodiments, the cyclic guanidine is incorporated into an epoxy functional polymer by reacting with an epoxy functional group on the polymer. The preparation of a polymer incorporating the cyclic guanidine will be discussed in greater detail in the Examples section below.

In some embodiments of the present invention, the polymeric reaction product of the cyclic guanidine and a polymer may be rendered cationic and water dispersible by a variety of methods. For example, in some embodiments, the reaction product of a polymer and the cyclic guanidine is rendered cationic and water dispersible by neutralizing at least a portion of the cyclic guanidine moieties that are bonded to the polymer with an acid such as lactic acid, acetic acid, sulfamic formic acid, phosphoric acid, methanesulfonic acid, para toluenesulfonic acid, dimethylolpropionic acid, other acids, or combinations thereof. In some embodiments, the polymer is rendered cationic and water dispersible by neutralizing at least a portion of the amines that are bonded to the polymer with an acid (i.e., the cyclic guanidines are not neutralized). In yet other embodiments, the polymer is rendered cationic and water dispersible by neutralizing at least a portion of the cyclic guanidines and at least a portion of the amines, each of which are bonded to the polymer, with an acid.

As stated above, in certain embodiments of the invention, the curing agent that is utilized in the electrodepositable coating composition comprises the reaction product of the cyclic guanidine and an isocyanate and, in certain embodiments, further comprises the unreacted phenol source. In some embodiments, isocyanate comprises aliphatic isocyanate, an aromatic isocyanate, or combinations thereof. One potential advantage of these embodiments is that the incorporation of the cyclic guanidine into the curing agent creates a blocked curing catalyst. In other words, upon the application of heat to the curing agent, the cyclic guandine is released from the curing agent and is utilized to catalyze the curing process of the electrodepositable coating composition.

Moreover, in some embodiments, the cyclic guanidine is used to block at least a portion of the curing agent. In some embodiments, the unreacted phenol source is added to the cyclic guanidine reaction product that is used to block at least a portion of the curing agent. Accordingly, it will be understood that once the curing agent is de-blocked (i.e., the cyclic guanidine is no longer blocking the curing agent), the curing agent is able to react with functional groups on the main film-forming polymer thereby curing the main film-forming polymer while the cyclic guanidine catalyzes the curing process.

As stated above, in certain embodiments, a crater control additive, which can be incorporated into the electrodepositable coating composition, can comprise the cyclic guanidine. In certain embodiments, the unreacted phenol source is added to the cyclic guanidine reaction product and the crater control additive. Suitable crater control additives include, without limitation, those described in U.S. Pat. Nos. 4,420,574, 4,423, 166, and 4,423,850, which are incorporated herein by reference. For example, in some embodiments, the cyclic guanidine can be used in lieu of at least a portion of the amines that are utilized to form the crater control additive.

As stated above, in some embodiments, a microgel, which can be incorporated into the electrodepositable coating composition, can comprise the cyclic guanidine. In some embodiments, the unreacted phenol source is added to the cyclic guanidine reaction product and the microgel. A suitable microgel that can be utilized is described in U.S. Pat. No. 5,096,556, which is incorporated herein by reference. For example, in certain embodiments, the cyclic guanidine can be used in lieu of at least a portion of the amines that are utilized to form the microgel.

The electrodepositable coating composition of the present invention can be applied onto a number of substrates. Accordingly, the present invention is further directed to a substrate that is coated, at least in part, with the electrodepositable coating composition described herein. It will be understood that the electrocoating coating composition can be applied onto a substrate as a monocoat or as a coating layer in a multi-layer coating composite. Non-limiting examples of a suitable substrate can include a metal, a metal alloy, and/or a substrate that has been metallized such as nickel plated plastic. For example, the metal or metal alloy can include aluminum and/or steel. In one embodiment, the steel could be cold rolled steel, electrogalvanized steel, and hot dipped galvanized steel. In one embodiment, at least a portion of the surface of the metallic surface onto which the coating is applied is pretreated with phosphate, such as zinc phosphate. In certain embodiments, the coated substrate may comprise a portion of a vehicle such as a vehicular body (e.g., without limitation, door, body panel, trunk deck lid, roof panel, hood, and/or roof) and/or a vehicular frame. As used herein, the term "vehicle" or variations thereof includes, but is not limited to, civilian, commercial, and military land vehicles such as cars and trucks.

Moreover, the electrodepositable coating composition of the present invention may be applied onto the substrate to impart a wide variety of properties such as, but not limited to, corrosion resistance, chip resistance, filling (i.e., ability to hide underlying substrate roughness), abrasion resistance, impact damage, flame and/or heat resistance, chemical resistance, UV light resistance, and/or structural integrity.

Depending on the substrate, the electrodepositable coating composition that includes the addition of unreacted phenol to the cyclic guanidine-containing coating composition may be applied (i.e., electrodeposited) onto a substrate using a current density of 0.5 to 5 mA/cm$^2$, such as 1 to 3 mA/cm$^2$, such as 1 to 2 mA/cm$^2$. One skilled in the art will understand that the voltage at which electrodeposition is carried out, and the length of time of electrodeposition, can vary and may be adjusted to accommodate a variety of electrodeposition bath conditions.

In some embodiments, the electrodepositable coating composition that includes the addition of unreacted phenolic compounds to the cyclic-guanidine coating composition may demonstrate improved throwpower as compared to similar coatings without the addition of unreacted phenol. In particular some embodiments may demonstrate a coulombic usage of less than 100 coulombs per gram when applied over a conductive substrate which is not pretreated. Some embodiments may typically demonstrate a coulombic usage of less than 50 coulombs per gram, such as less than 40 coulombs per gram or less when applied over bare, non pretreated conductive substrates using coating conditions limited ≤1.5 milliamp per square centimeter. Some embodiments of the present invention may demonstrate coulombic usage of less than, for example, 100 coulombs per gram when applied over a conductive substrate containing a pretreatment with a thickness of less than 1 micron, such as 0.5 micron.

After the coating has been applied onto the substrate via electrodeposition, in one embodiment, the coating is cured by baking the substrate at an elevated temperature ranging from 90° C. to 260° C. for a time period ranging from 1 minute to 40 minutes.

As stated above, in certain embodiments, the electrodepositable coating composition of the present invention is utilized in an electrocoating layer that is part of a multi-layer coating composite comprising a substrate with various coating layers. The coating layers could include a pretreatment layer, such as a phosphate layer (e.g., zinc phosphate layer) or a Group IIIB and/or Group IVB layer (such as zirconium), an electrocoating layer which results from the electrodepositable coating composition of the present invention, and suitable top coat layers (e.g., base coat, clear coat layer, pigmented monocoat, and color-plus-clear composite compositions). It is understood that suitable topcoat layers include any of those known in the art, and each independently may be waterborne, solventborne, in solid particulate form (i.e., a powder coating composition), or in the form of a powder slurry. The top coat typically includes a film-forming polymer, crosslinking material and, if a colored base coat or monocoat, one or more pigments. In one embodiment, the primer layer is disposed between the electrocoating layer and the base coat layer. In certain embodiments, one or more of the topcoat layers are applied onto a substantially uncured underlying layer. For example, in some embodiments, a clear coat layer is applied onto at least a portion of a substantially uncured basecoat layer (wet-on-wet), and both layers are simultaneously cured in a downstream process.

Moreover, in some embodiments, the top coat layers may be applied directly onto the electrodepositable coating layer. In other words, in some embodiments, the substrate lacks a primer layer. For example, in some embodiments, a basecoat layer is applied directly onto at least a portion of the electrodepositable coating layer.

It will also be understood that in certain embodiments, the top coat layers may be applied onto an underlying layer despite the fact that the underlying layer has not been fully cured. For example, a clearcoat layer may be applied onto a basecoat layer even though the basecoat layer has not been subjected to a curing step. Both layers can then be cured during a subsequent curing step thereby eliminating the need to cure the basecoat layer and the clearcoat layer separately.

In certain embodiments, additional ingredients such as colorants and fillers can be present in the various coating compositions from which the top coat layers result. Any suitable colorants and fillers may be used. For example, the colorant can be added to the coating in any suitable form, such as discrete particles, dispersions, solutions and/or flakes. A single colorant or a mixture of two or more colorants can be used in the coatings of the present invention. It should be noted that, in general, the colorant can be present in a layer of the multi-layer composite in any amount sufficient to impart the desired property, visual and/or color effect.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPP red BO"), titanium dioxide, carbon black, zinc oxide, antimony oxide, etc. and organic or inorganic UV opacifying pigments such as iron oxide, transparent red or yellow iron oxide, phthalocyanine blue and mixtures thereof. The terms "pigment" and "colored filler" can be Used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

In some embodiments, special effect compositions that may be used in one or more layers of the multi-layer coating composite include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In other embodiments, a photosensitive composition and/or photochromic composition, which reversibly alters its color when exposed to one or more light sources, can be used in a number of layers in the multi-layer composite. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

EXAMPLES

Example 1a

Urethane Cross-Linker

TABLE 1a

| Ingredients | Parts by Weight |
| --- | --- |
| 2-butoxy ethanol | 1498.0 |
| Dibutyl tin dilaurate | 4.0 |
| Methanol | 947.9 |
| Methyl isobutyl ketone | 1538.6 |
| Diphenylmethylene diisocyanate [1] | 5628.0 |

[1] Rubinate M, available from Huntsman Corporation 2-butyoxy ethanol, dibutyl tin dilaurate, methanol, and methyl isobutyl ketone were charged to a flask and warmed to 30° C. Diphenylmethylene diisocyanate was then added over three hours, maintaining a maximum temperature during the addition of 100° C. After the addition was complete, the mixture was held one hour at 100° C. IR analysis showed no NCO stretch present, indicating the isocyanate had been completely consumed.

Example 1

Resin I

TABLE 1

| Ingredients | Parts by Weight |
| --- | --- |
| EPON 828 [1] | 1229.4 |
| Bisphenol A | 544.1 |
| Bisphenol A - ethylene oxide adduct (1/6 molar ratio) | 140.8 |
| Methyl isobutyl ketone | 59.2 |
| Ethyltriphenyl phosphonium iodide | 1.2 |
| Bisphenol A - ethylene oxide adduct (1/6 molar ratio) | 200.0 |
| Methyl isobutyl ketone | 101.6 |
| 1,5,7-triazabicyclo[4.4.0]dec-5-ene [2] | 180.2 |
| Diketimine [3] | 102.5 |
| N-Methylethanol amine | 65.6 |
| Acetic acid | 26.0 |
| Urethane Crosslinker (Example 1a) | 1432.6 |
| 90% Formic Acid | 31.5 |
| Water | 2050.3 |
| Water | 2483.6 |

[1] Diglycidyl ether of bisphenol A having an epoxy equivalent weight of 188, commercially available from Momentive Specialty Chemicals
[2] Solution consisting of 28.7% 1,5,7-triazabicyclo[4.4.0]dec-5-ene and 71.3% bisphenol A-ethylene oxide adduct
[3] Diketimine derived from diethylene triamine and methyl isoubtyl ketone (70% solids in methyl isobutyl ketone)

Epon 828, bisphenol A, bisphenol A-ethylene oxide adduct, methyl isobutyl ketone, and ethyltriphenyl phosphonium iodide were charged into a reaction flask and heated under a nitrogen atmosphere to 130° C. The reaction mixture exothermed to 145° C. The mixture was then held at 145° C. for two hours. A second addition of bisphenol A-ethylene oxide adduct and methyl isobutyl ketone was added to the flask and the epoxy equivalent weight was determined to be 1,314 (theory=1,289). A temperature of 105° C. was established and 1,5,7-triazabicyclo[4.4.0]dec-5-ene, N-methylethanol amine, and diketimine were added to the flask. The reaction mixture exothermed to 116° C. After the exotherm was complete, a temperature of 120° C. was established and the mixture was held for one hour. Acetic acid was then added to the flask, followed by the addition of urethane crosslinker ten minutes later. A temperature of 110° C. was established and the mixture was held for 10 minutes. 85 weight percent of the mixture was then dispersed into water and formic acid. After stirring for 30 minutes, the additional water charge was added. The dispersed resin was then vacuum distilled to remove methyl isobutyl ketone.

Example 2

Resin II

TABLE 2

| Charge | Ingredients | Parts by Weight |
| --- | --- | --- |
| 1 | EPON 828 [1] | 559.4 |
| 2 | Bisphenol A | 247.2 |
| 3 | Bisphenol A - ethylene oxide adduct (1/6 molar ratio) | 54.8 |
| 4 | Methyl isobutyl ketone | 26.6 |
| 5 | Ethyltriphenyl phosphonium iodide | 0.5 |
| 6 | Bisphenol A - ethylene oxide adduct (1/6 molar ratio) | 113.8 |
| 7 | Methyl isobutyl ketone | 46.1 |
| 8 | 1,5,7-triazabicyclo[4.4.0]dec-5-ene [2] | 68.2 |
| 9 | Diketimine [3] | 46.8 |
| 10 | N-Methylethanol amine | 32.0 |
| 11 | Acetic acid | 10.0 |
| 12 | Phenol Adduct (see example 12-JCS-106) | 13.7 |
| 13 | Urethane Crosslinker (Example 1a) | 660.2 |
| 14 | 90% Formic Acid | 17.1 |
| 15 | H2O | 1020.0 |
| 16 | H2O | 1237.2 |

[1] Diglycidyl ether of bisphenol A having an epoxy equivalent weight of 188, commercially available from Momentive Specialty Chemicals
[2] Solution consisting of 28.7% 1,5,7-triazabicyclo[4.4.0]dec-5-ene and 71.3% bisphenol A-ethylene oxide adduct
[3] Diketimine derived from diethylene triamine and methyl isoubtyl ketone (70% solids in methyl isobutyl ketone)

Charges 1, 2, 3, 4, and 5 were added to a 4-necked flask fitted with a thermocouple, nitrogen sparge, and a mechanical stirrer. Under an $N_2$ blanket and agitation, the flask was heated to 130° C. The reaction mixture exothermed to 157° C. The mixture was then held at 145° C. for two hours. Charges 6 and 7 were then added to the flask and the epoxy equivalent weight was determined to be 1,297 (theory=1,299). A temperature of 105° C. was established and charges 8, 9, and 10 were added to the flask. The reaction mixture exothermed to 118° C. After the exotherm was complete, a temperature of 122° C. was established and the mixture was held for one hour. Charge 11 was then added to the flask, followed by the addition of charges 12 and 13 ten minutes later. A temperature of 110° C. was established and the mixture was held for 10 minutes. 92 weight percent of the mixture was then dispersed into a premixed solution of charged 14 and 15. After stirring for 30 minutes, the additional water charge was added. The dispersed resin was then vacuum distilled to remove methyl isobutyl ketone. The resulting aqueous dispersion had a solids content of 40.08%.

GPC analyses to determine polymer weight and Z average showed values of 9,583 and 19,729, respectively and were done with DMF using polystyrene standards.

Example 3

Resin III

TABLE 3

| Charge | Ingredients | Parts by Weight |
| --- | --- | --- |
| 1 | EPON 828 [1] | 504.0 |
| 2 | Bisphenol A | 222.8 |
| 3 | Bisphenol A - ethylene oxide adduct (1/6 molar ratio) | 65.9 |
| 4 | Methyl isobutyl ketone | 24.5 |
| 5 | Ethyltriphenyl phosphonium iodide | 0.5 |
| 6 | Bisphenol A - ethylene oxide adduct (1/6 molar ratio) | 102.5 |
| 7 | Methyl isobutyl ketone | 21.5 |
| 8 | 1,5,7-triazabicyclo[4.4.0]dec-5-ene [2] | 68.5 |
| 9 | Diketimine [3] | 42.2 |
| 10 | N-Methylethanol amine | 27.7 |
| 11 | Acetic acid | 10.0 |
| 12 | Phenol Adduct (see example 12-JCS-106) | 137.4 |
| 13 | Urethane Crosslinker (Example 1a) | 663.1 |
| 14 | 90% Formic Acid | 17.2 |

TABLE 3-continued

| Charge | Ingredients | Parts by Weight |
|---|---|---|
| 15 | H2O | 1026.2 |
| 16 | H2O | 2110.7 |

[1] Diglycidyl ether of bisphenol A having an epoxy equivalent weight of 188, commercially available from Momentive Specialty Chemicals
[2] Solution consisting of 28.7% 1,5,7-triazabicyclo[4.4.0]dec-5-ene and 71.3% bisphenol A-ethylene oxide adduct
[3] Diketimine derived from diethylene triamine and methyl isoubtyl ketone (70% solids in methyl isobutyl ketone)

Charges 1, 2, 3, 4, and 5 were added to a 4-necked flask fitted with a thermocouple, nitrogen sparge, and a mechanical stirrer. Under an $N_2$ blanket and agitation, the flask was heated to 130° C. The reaction mixture exothermed to 160° C. The mixture was then held at 145° C. for two hours. Charges 6 and 7 were then added to the flask and the epoxy equivalent weight was determined to be 1,292 (theory=1,295). A temperature of 105° C. was established and charges 8, 9, and 10 were added to the flask. The reaction mixture exothermed to 121° C. After the exotherm was complete, a temperature of 122° C. was established and the mixture was held for one hour. Charge 11 was then added to the flask, followed by the addition of charges 12 and 13 ten minutes later. A temperature of 110° C. was established and the mixture was held for 10 minutes. 92 weight percent of the mixture was then dispersed into a premixed solution of charged 14 and 15. After stirring for 30 minutes, the additional water charge was added. The dispersed resin was then vacuum distilled to remove methyl isobutyl ketone. The resulting aqueous dispersion had a solids content of 40.01%.

GPC analyses to determine polymer weight and Z average showed values of 8,967 and 18,897, respectively and were done with DMF using polystyrene standards.

Example 4

Resin IV

TABLE 4

| Ingredients | Parts by Weight |
|---|---|
| EPON 828 [1] | 614.7 |
| Bisphenol A | 262.2 |
| D.E.N. 425 [2] | 14.0 |
| Bisphenol A - ethylene oxide adduct (1/6 molar ratio) | 72.5 |
| Methyl isobutyl ketone | 29.8 |
| Ethyltriphenyl phosphonium iodide | 0.6 |
| Bisphenol A - ethylene oxide adduct (1/6 molar ratio) | 100.0 |
| Methyl isobutyl ketone | 65.5 |
| 1,5,7-triazabicyclo[4.4.0]dec-5-ene [3] | 90.6 |
| Diketimine [4] | 51.5 |
| N-Methylethanol amine | 33.0 |
| Tannic acid | 13.7 |
| Urethane Crosslinker (Example 1a) | 720.5 |
| 90% Formic Acid | 25.3 |
| Water | 1029.7 |
| Water | 1258.6 |

[1] Diglycidyl ether of bisphenol A having an epoxy equivalent weight of 188, commercially available from Momentive Specialty Chemicals
[2] Epoxy novolac resin available from Dow
[3] Solution consisting of 29.0% 1,5,7-triazabicyclo[4.4.0]dec-5-ene and 71.0% bisphenol A-ethylene oxide adduct
[4] Diketimine derived from diethylene triamine and methyl isobutyl ketone (70% solids in methyl isobutyl ketone)

Epon 828, bisphenol A, D.E.N. 425, bisphenol A-ethylene oxide adduct, methyl isobutyl ketone, and ethyltriphenyl phosphonium iodide were charged into a reaction flask and heated under a nitrogen atmosphere to 130° C. The reaction mixture exothermed to 145° C. The mixture was then held at 145° C. for two hours. A second addition of bisphenol A-ethylene oxide adduct and methyl isobutyl ketone was added to the flask and a temperature of 105° C. was established. 1,5,7-triazabicyclo[4.4.0]dec-5-ene, N-methylethanol amine, and diketimine were added to the flask. The reaction mixture exothermed to 116° C. After the exotherm was complete, a temperature of 120° C. was established and the mixture was held for one hour. Tannic acid was then added to the flask, followed by the addition of urethane crosslinker ten minutes later. A temperature of 110° C. was established and the mixture was held for 10 minutes. 85 weight percent of the mixture was then dispersed into water and formic acid. After stirring for 30 minutes, the additional water charge was added. The dispersed resin was then vacuum distilled to remove methyl isobutyl ketone.

Example 5

Resin V

TABLE 5

| Ingredients | Parts by Weight |
|---|---|
| Epon 828 [1] | 1546.5 |
| Bisphenol A | 658.5 |
| Ethyltriphenyl phosphonium iodide | 1.5 |
| Bisphenol A - ethylene oxide adduct (1/6 molar ratio) | 245.0 |
| Mazon 1651 [2] | 416.1 |
| Epon 828 | 26.5 |
| Mazon 1651 | |
| Amine salt intermediate (Example 5a) | |
| Water | |

[1] Diglycidyl ether of bisphenol A having an epoxy equivalent weight of 188, commercially available from Momentive Specialty Chemicals
[2] Butylcarbitol formal available from BASF Corporation Epon 828, bisphenol A, ethyltriphenyl phosphonium iodide, bisphenol A-ethylene oxide adduct, and mazon 1651 were charged to a reaction vessel equipped with mechanical stirrer, condenser, and nitrogen inlet. The mixture was heated to 140° C. and allowed to exotherm to 191° C. Upon completion of the exotherm, the mixture was cooled to 160° C. and held for one hour. Mazon 1651 was then added to aid cooling to 120° C. At 120° C., Epon 828 and Mazon 1651 were added and the reaction mixture was held for one hour at this temperature. The mixture was then cooled to 90° C. and the amine salt intermediate, which had been preheated to 70° C., was added over 90 minutes. After the amine salt intermediate had been added, water was added and the mixture was held for 6 hours at 80-82° C.

Example 5A

Amine Salt Intermediate

TABLE 5A

| Ingredients | Parts by Weight |
|---|---|
| Dimethylethanol amine | 356.6 |
| Diphenylmethylene diisocyanate [1] | 528.8 |
| Mazon 1651 [2] | 17.7 |
| Formic acid | 204.4 |
| Water | 1107.5 |

[1] PAPI 2940, available from Dow
[2] Butylcarbitol formal available from BASF Corporation Dimethylethanol amine was added to a reaction vessel equipped with a mechanical stirrer, condenser, and nitrogen inlet and heated to 40° C. Diphenylmethylene diisocyanate was added over 90 minutes while maintaining a maximum temperature of 100° C. After the addition was complete, the mixture was held for 30 minutes. IR analysis showed no NCO stretch present, indicating the isocyanate had been completely consumed. Formic acid and water were then added and the mixture was held at 70° C. for three hours.

Example 6

Resin VI

TABLE 6

| Ingredients | Parts by Weight |
| --- | --- |
| EPON 828 [1] | 614.7 |
| Bisphenol A | 259.9 |
| D.E.N. 425 [2] | 17.2 |
| Bisphenol A - ethylene oxide adduct (1/6 molar ratio) | 73.2 |
| Methyl isobutyl ketone | 29.8 |
| Ethyltriphenyl phosphonium iodide | 0.6 |
| Bisphenol A - ethylene oxide adduct (1/6 molar ratio) | 100.0 |
| Methyl isobutyl ketone | 50.5 |
| 1,5,7-triazabicyclo[4.4.0]dec-5-ene [3] | 89.6 |
| Diketimine [4] | 51.6 |
| N-Methylethanol amine | 33.1 |
| Acetic acid | 13.1 |
| Urethane Crosslinker (Example 1a) | 720.9 |
| 90% Formic Acid | 15.7 |
| Water | 1032.0 |
| Water | 1249.8 |

[1] Diglycidyl ether of bisphenol A having an epoxy equivalent weight of 188, commercially available from Momentive Specialty Chemicals
[2] Epoxy novolac resin available from Dow
[3] Solution consisting of 29.0% 1,5,7-triazabicyclo[4.4.0]dec-5-ene and 71.0% bisphenol A-ethylene oxide adduct
[4] Diketimine derived from diethylene triamine and methyl isoubtyl ketone (70% solids in methyl isobutyl ketone)

Epon 828, bisphenol A, D.E.N. 425, bisphenol A-ethylene oxide adduct, methyl isobutyl ketone, and ethyltriphenyl phosphonium iodide were charged into a reaction flask and heated under a nitrogen atmosphere to 130° C. The reaction mixture exothermed to 145° C. The mixture was then held at 145° C. for two hours. A second addition of bisphenol A-ethylene oxide adduct and methyl isobutyl ketone was added to the flask and a temperature of 105° C. was established. 1,5,7-triazabicyclo[4.4.0]dec-5-ene, N-methylethanol amine, and diketimine were added to the flask. The reaction mixture exothermed to 116° C. After the exotherm was complete, a temperature of 120° C. was established and the mixture was held for one hour. Acetic acid was then added to the flask, followed by the addition of urethane crosslinker ten minutes later. A temperature of 110° C. was established and the mixture was held for 10 minutes. 85 weight percent of the mixture was then dispersed into water and formic acid. After stirring for 30 minutes, the additional water charge was added. The dispersed resin was then vacuum distilled to remove methyl isobutyl ketone.

Example 7

Resin VII

TABLE 7

| Ingredients | Parts by Weight |
| --- | --- |
| DER 732 [1] | 3523.9 |
| Bisphenol A | 853.6 |

TABLE 7-continued

| Ingredients | Parts by Weight |
| --- | --- |
| Mazon 1651 [2] | 43.8 |
| Benzyldimethylamine | 8.3 |
| Mazon 1651 | 274.2 |
| Jeffamine D-400 [3] | 924.4 |
| Mazon 1651 | 43.8 |
| Epon 828 [4] (85% solids in Mazon 1651) | 112.4 |
| Mazon 1651 | 17.2 |

[1] Diglycidyl ether of propylene glycol (600 molecular weight) available from Dow
[2] Butylcarbitol formal available from BASF Corporation
[3] Polypropylene glycol diamine available from Huntsman Corporation
[4] Diglycidyl ether of bisphenol A having an epoxy equivalent weight of 188, commercially available from Momentive Specialty Chemicals DER 732, Bisphenol A, and Mazon 1651 were added to a suitable vessel equipped with a mechanical stirrer, reflux condenser, and a nitrogen inlet and heated to 130° C. under mild agitation. Benzyldimethylamine and Mazon 1651 were then added and the reaction mixture was allowed to exotherm until reaching a temperature of 135° C. That temperature was held for approximately 2 hours and the reaction mixture had an epoxy equivalent weight of 1,220 based on resin solids. Mazon 1651 and Jeffamine D-400 were added sequentially to the vessel to cool the mixture to 90° C. The mixture was then held at this temperature for 4.5 hours. The reaction mixture had a viscosity of J-K (as determined by a Gardner-Holt bubble viscosity tube with the sample reduced to 50% solids in 1-methoxy-2-propanol). Epon 828, reduced to 85% solids in Mazon 1651, was then added and the reaction mixture held for 1.5 hours at 90° C. The epoxy resin thus prepared had a Gardner-Holt bubble viscosity of P.

Example 8

Paste VIII

TABLE 8a

| # | Gray Part | Weight parts |
| --- | --- | --- |
| 1 | Cationic Resin III | 3502 |
| 2 | butyl Carbitol formal [1] | 117 |
| 3 | propyleneglycol n-butyl ether[2] | 235 |
| 4 | ethyleneglycol n-butyl ether[3] | 206 |
| 5 | CSX-333 Carbon Black[4] | 101 |
| 6 | TiO$_2$[5] | 3017 |
| 7 | Kaolin clay[6] | 1164 |
| 8 | Barium Sulfate[7] | 151 |
| 9 | Deionized water | 976 |
| | | 9468.4 |

[1] available as Mazon 1651 from BASF Corporation
[2] Propasol B available from Dow Chemical Corporation
[3] Butyl Cellosolve available from Dow Chemical Corporation
[4] Cabot Corporation
[5] CR800E available from Tronox Corp.
[6] ASP-200 available from BASF
[7] Blanc Fixe micro available from Sachtleben Chemie GMBH Materials 1 through 4 were preblended in a flat bottom plastic container. Materials 5 through 9 were added and mixed under a high shear cowls for 30 minutes. The paste was then transferred to a RED HEAD media mill equipped with a water cooling jacket and using 2 mm zircoa media. The paste was then milled until a Hegman of >7 was observed.

TABLE 8b

| # | Silica Part | Weight parts |
|---|---|---|
| 1 | Cationic Resin III | 3643 |
| 2 | butyl Carbitol formal | 122 |
| 3 | propyleneglycol n-butyl ether[2] | 244 |
| 4 | propyleneglycol n-butyl ether[2] | 214 |
| 5 | Silica [8] | 559 |
| 6 | deionized water | 132 |

Materials 1 through 4 were preblended in a flat bottom stainless steel container. Material 5 was added and the mixture subjected to stirring with a 3 inch diameter cowls blade at 3000 rpm for 35 minutes. Material 6 was added and the mixture cooled by applying cold water to the exterior of the container.

TABLE 8c

| # | Combined paste: blend of gray and silica part | |
|---|---|---|
| 1 | Gray part: all | 9468 |
| 2 | Silica part: all | 4915 |
| 3 | deionized water | 270 |

The gray paste shown in Table 8a and the silica cowls shown in Table 8b were blended together under mild agitation using a propeller shaped stirring blade.

Example 9

Electrocoat Baths

TABLE 9

| Material | Paint a | Paint b | Paint c | Paint d | Paint e | Paint f |
|---|---|---|---|---|---|---|
| Resin I | 2619 | 2619 | | | | |
| Resin II | | | 1342 | | | |
| Resin III | | | | 1344 | | |
| Resin VI | | | | | 1400 | |
| Resin IV | | | | | | 1289 |
| Deionized water | 2600 | 2600 | 1300 | 1300 | 1300 | 1300 |
| Resin VII | 234 | 234 | 117 | 117 | 117 | 117 |
| butyl Carbitol formal | 35.1 | 35 | 17.5 | 17.5 | 17.5 | 17.5 |
| Propasol B (propylene glycol n-butyl ether) | | | | | 17.5 | |
| Butyl Cellosolve | 25.4 | | 11.7 | 11.7 | | 11.7 |
| 2/1 blend of Butyl Cellosolve and Bisphenol-A | | 38.1 | | | | |
| Deionized water | 1000 | 1000 | 500 | 500 | 500 | 500 |
| Paste VIII | 519 | 519 | 264 | 264 | 260 | 264 |
| Deionized water | 968 | 956 | 449 | 446 | 388 | 501 |
| Sum | 8000 | 8001 | 4000 | 4000 | 4000 | 4000 |

To prepare the electrocoat baths a main resin (1) is diluted with deionized water (2) under mild agitation. Film build modifiers and additives (numbers 4 through 7) are added to the crater control modifier (3) and mixed until uniform. This mixture is diluted with more deionized water (8) and added to the stirring resin blend (1 and 2). Pigment paste of Example VIII is added directly to the stirring resin blend without dilution. Deionized water (10) is added to complete the electrocoat bath.

It is the purpose of this invention to improve the electrodeposition efficiency of electrocoats over a variety of metallic substrates, which use as their cure catalyst compounds containing cyclic guanidine groups (this terminology could perhaps be improved).

Example 10

Throwpower

The Ford test method used in the Examples herein is summarized in FLTM B1 120-02. The following Conditions were utilized:

Condition A: 50 v, 1 minute, current limited to 1.1 mA/cm$^2$, 1 min voltage ramp;

Condition D: 100 v, 1 minute, current limited to 1.1 mA/cm$^2$, 30 sec voltage ramp;

Condition F: 220 v, 2.5 minutes, current limited to 1.1 mA/cm$^2$, 30 sec voltage ramp; and Condition G: 220 v, no amp limit, 2.5 minutes, 30 sec voltage ramp.

TABLE 10a

Bare Steel (APR 28110 available from ACT Test Panels LLC, Hillsdale, MI)*

| | | Condition G | | Condition F | | Condition D | | Condition A | |
|---|---|---|---|---|---|---|---|---|---|
| Coat-out T (° F.) | Paint | Film thickness (micron) | Coulombic usage ** | Film thickness (micron) | Coulombic usage | Film thickness (micron) | Coulombic usage | Film thickness (micron) | Coulombic usage |
| 93 | a | 24.1 | 37 | 0 | Infinite | 0 | Infinite | 0 | Infinite |
| 88 | b | 19.8 | 37 | 20.8 | 37 | 9.7 | 40 | 5.1 | 68 |
| 92 | c | 19.1 | 43 | 0 | Infinite | 0 | Infinite | 0 | Infinite |
| 90 | d | 19.6 | 39 | 20.8 | 39 | 10.2 | 46 | 5.6 | 69 |
| 93 | e | 19.1 | 55 | 0.3 | 3200 | 0 | Infinite | 0 | Infinite |
| 92 | f | 17.8 | 41 | 18.0 | 45 | 8.1 | 62 | 6.1 | 70 |

*Solvent wiped with aliphatic hydrocarbon followed by acetone
** Coulombic efficiency is reported as coulombs per gram of dried coating, calculated by using a theoretical film density of 1.26 g/cc.

TABLE 10b

| | | Condition G | | Condition F | | Condition D | | Condition A | |
|---|---|---|---|---|---|---|---|---|---|
| Coat-out T (°F.) | Paint | Film thickness (micron) | Coulombic usage ** | Film thickness (micron) | Coulombic usage | Film thickness (micron) | Coulombic usage | Film thickness (micron) | Coulombic usage |
| 93 | a | 16.5 | 40 | 9.4 | 103 | 6.1 | 89 | 4.8 | 64 |
| 88 | b | 17.0 | 39 | 16.5 | 40 | 6.6 | 53 | 3.6 | 76 |
| 92 | c | 15.0 | 49 | 14.5 | 48 | 2.8 | 166 | 4.3 | 63 |
| 90 | d | 16.0 | 43 | 15.0 | 46 | 5.6 | 62 | 3.3 | 70 |
| 93 | e | 15.5 | 37 | 13.7 | 59 | 6.8 | 73 | 5.1 | 76 |
| 92 | f | 13.5 | 49 | 13.0 | 48 | 5.3 | 65 | 6.1 | 63 |

Throwpower data for Paints c, f, and d are illustrated graphically in FIG. 1. These data and the data provided in Tables 10a and 10b above demonstrate that cyclic guanidine-containing electrocoats which are modified with unreacted phenol have a distinct advantage in the important property of throwpower and also in the associated property of electrical efficiency when voltage, time, and current density are representative of interior sections of a coated article.

Example 11

Throwpower Over Zirconium Pretreated Steel

Bare steel (APR 28110) panels were pretreated with Zircobond (a zirconium-containing pretreatment commercially available from PPG Industries, Inc., Marly, France). Panels were then painted with either Paint a or Paint b and subjected to throwpower testing using a Ngoya Box Throwpower Test. Data are shown in Table 11.

TABLE 11

| | | Throwpower (Ngoya Box Test) | | |
|---|---|---|---|---|
| | | | Face Designation | |
| | | A | B | C |
| | | (20 Cu/90 FF/10 Fe) | | |
| | | Film Thickness in microns, Ngoya Throwpower | | |
| Paint a + ZB pretreatment layer * | 90°/100 Volts ** | 17 | 8 | 10 |
| Paint b + ZB pretreatment layer * | 90°/100 Volts ** | 15 | 10.5 | 11.5 |

* Pretreatment with Zircobond
** Voltage of 100 is too low for faces D through G These data demonstrate that the inclusion of BPA in the cyclic-guanidine containing paint in combination with a zircobond pretreatment layer improves the throwpower even further.

In summary, the data shown herein demonstrate that when electrodeposited over bare steel, the advantages of phenolic compounds to cyclic guanidine-containing electrocoats are striking. The resulting applied film thicknesses and coulombic usages are remarkably desirable and are resilient with respect to electrical conditions.

We claim:

1. An electrodepositable coating composition comprising:
   a reaction product of an epoxy functional polymer and a cyclic guanidine; and
   a source of unreacted phenol,
   wherein the electrodepositable coating composition has a columbic usage of less than 100 coulombs/gram when deposited on a conductive substrate at a current density of ≤1.5 mAmps/cm².

2. The electrodepositable coating composition of claim 1, wherein the cyclic guanidine comprises structure (II), structure (III), or a combination thereof:

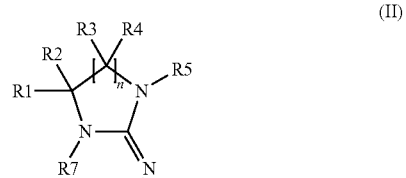

(II)

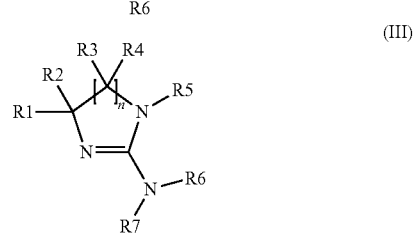

(III)

wherein each of R1, R2, R3, R4, R5, R6, R7 comprise hydrogen, (cyclo)alkyl, aryl, aromatic, organometallic, a polymeric structure, or together can form a cycloalkyl, aryl, or an aromatic structure, and wherein R1, R2, R3, R4, R5, R6, and R7 can be the same or different, and wherein n≥1.

3. The electrodepositable coating composition of claim 1, wherein the cyclic guanidine comprises structure (IV), structure (V), or a combination thereof:

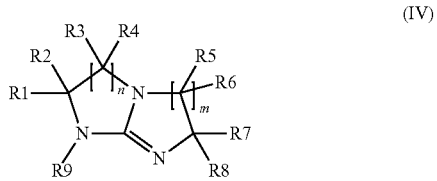

(IV)

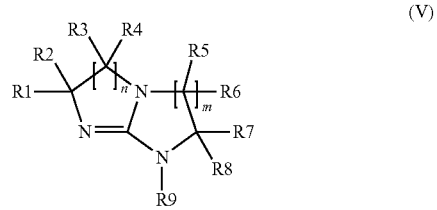

(V)

wherein each of R1, R2, R3, R4, R5, R6, R7, R8, or R9 comprises hydrogen, (cyclo)alkyl, aryl, aromatic, organometallic, a polymeric structure, or together can form a cycloalkyl, aryl, or an aromatic structure, and wherein R1, R2, R3, R4, R5, R6, R7, R8, and R9 can be the same or different, and wherein n and m are both ≥1, and wherein n and m may be the same or different.

4. The electrodepositable coating composition of claim 1, wherein the cyclic guanidine comprises 1,5,7-triazabicyclo[4.4.0]dec-5-ene.

5. The electrodepositable coating composition of claim 1, further comprising a polymer and a curing agent.

6. The electrodepositable coating composition of claim 1, wherein the source of unreacted phenol comprises bisphenol-A, gallic acid, tannic acid, an epoxy-bound bisphenol A, or combinations thereof.

7. The electrodepositable coating composition of claim 1, wherein the source of unreacted phenol is present in an amount of at least 0.5 molar equivalent to 1 molar equivalent of the cyclic guanidine.

8. The electrodepositable coating composition of claim 1, wherein the source of unreacted phenol is present in an amount of at least 1 molar equivalent to 1 molar equivalent of the cyclic guanidine.

9. The electrodepositable coating composition of claim 1, wherein the source of unreacted phenol is present in an amount of more than 1 molar equivalent to 1 molar equivalent of the cyclic guanidine.

10. A method for coating a metal substrate comprising:
    forming a reaction product comprising an epoxy functional polymer and a cyclic guanidine; and
    adding a source of unreacted phenol to the reaction product to form an electrodepositable coating composition.

11. The method according to claim 10, wherein the cyclic guanidine comprises structure (II), structure (III), or a combination thereof:

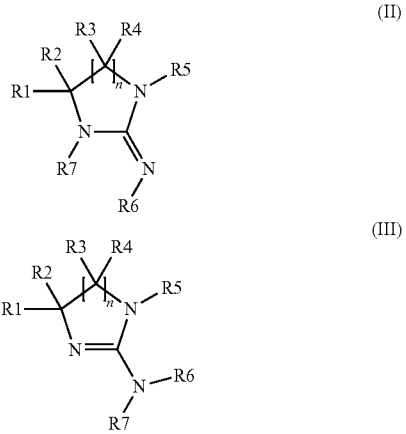

wherein each of R1, R2, R3, R4, R5, R6, R7 comprise hydrogen, (cyclo)alkyl, aryl, aromatic, organometallic, a polymeric structure, or together can form a cycloalkyl, aryl, or an aromatic structure, and wherein R1, R2, R3, R4, R5, R6, and R7 can be the same or different, and wherein n≥1.

12. The method according to claim 10, wherein the cyclic guanidine comprises structure (IV), structure (V), or a combination thereof:

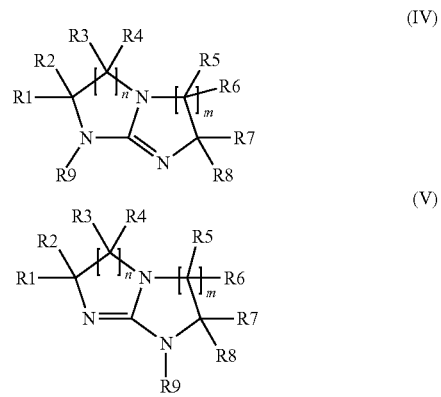

wherein each of R1, R2, R3, R4, R5, R6, R7, R8, or R9 comprises hydrogen, (cyclo)alkyl, aryl, aromatic, organometallic, a polymeric structure, or together can form a cycloalkyl, aryl, or an aromatic structure, and wherein R1, R2, R3, R4, R5, R6, R7, R8, and R9 can be the same or different, and wherein n and m are both ≥1, and wherein n and m may be the same or different.

13. The method according to claim 10, wherein the reaction product further comprises a polymer and a curing agent.

14. The method according to claim 10, wherein the source of unreacted phenol comprises bisphenol-A, gallic acid, tannic acid, an epoxy-bound bisphenol A, or combinations thereof.

15. The method according to claim 10, wherein the source of unreacted phenol is added in an amount of at least 0.5 molar equivalent to 1 molar equivalent of the cyclic guanidine.

16. The method according to claim 10, wherein the source of unreacted phenol is added in an amount of at least 1 molar equivalent to 1 molar equivalent of the cyclic guanidine.

17. The method according to claim 10, wherein the source of unreacted phenol is added in an amount of more than 1 molar equivalent to 1 molar equivalent of the cyclic guanidine.

18. The method according to claim 10, further comprising electrophoretically depositing the electrodepositable coating composition onto the metal substrate.

19. The method according to claim 10, further comprising pretreating the metal substrate with a phosphate or zirconium pretreatment solution prior to coating the substrate with the electrodepositable coating composition.

* * * * *